US011661010B2

(12) United States Patent
Coon et al.

(10) Patent No.: US 11,661,010 B2
(45) Date of Patent: May 30, 2023

(54) SYSTEMS AND METHODS FOR EGRESS FROM A MOTOR HOME

(71) Applicant: TIFFIN MOTOR HOMES, INC., Red Bay, AL (US)

(72) Inventors: Steven Coon, Red Bay, AL (US); Chris Melvin, Red Bay, AL (US)

(*) Notice: Subject to any disclaimer, the term of this patent is extended or adjusted under 35 U.S.C. 154(b) by 0 days.

(21) Appl. No.: 17/477,703

(22) Filed: Sep. 17, 2021

(65) Prior Publication Data

US 2022/0001805 A1 Jan. 6, 2022

Related U.S. Application Data

(63) Continuation of application No. 15/931,188, filed on May 13, 2020, now Pat. No. 11,135,979, which is a continuation of application No. 16/151,898, filed on Oct. 4, 2018, now Pat. No. 10,676,032.

(60) Provisional application No. 62/569,642, filed on Oct. 9, 2017.

(51) Int. Cl.
| | |
|---|---|
| *B60R 3/02* | (2006.01) |
| *B60J 5/04* | (2006.01) |
| *B62D 65/06* | (2006.01) |
| *B60R 3/00* | (2006.01) |
| *B60J 5/06* | (2006.01) |
| *B60P 3/32* | (2006.01) |

(52) U.S. Cl.
CPC ............... *B60R 3/02* (2013.01); *B60J 5/049* (2013.01); *B60J 5/06* (2013.01); *B60R 3/007* (2013.01); *B62D 65/06* (2013.01); *B60P 3/32* (2013.01); *E05Y 2900/512* (2013.01)

(58) Field of Classification Search
CPC . B60J 5/0468; B60J 5/047; B60J 5/049; B60J 5/06; B60P 3/32; B60P 3/34; B60R 3/007; B60R 3/02; B62D 65/06
USPC .............................. 296/146.3, 152, 156, 165
See application file for complete search history.

(56) References Cited

U.S. PATENT DOCUMENTS

| | | | | |
|---|---|---|---|---|
| 3,861,739 A | * | 1/1975 | Kinney | ..................... B60R 3/02 |
| | | | | 49/141 |
| 4,216,725 A | * | 8/1980 | Hallam | .................. B61D 17/20 |
| | | | | 49/141 |
| 6,173,812 B1 | * | 1/2001 | Spivey | ..................... B60R 3/02 |
| | | | | 296/156 |

(Continued)

FOREIGN PATENT DOCUMENTS

CA 2912083 A1 * 5/2016 ............ B60J 5/0472

OTHER PUBLICATIONS

Gone with the Wynns; located at https://www.gonewiththewynns.com/how-rv-emergency-exit-windows-work. (Year: 2014).*

*Primary Examiner* — Jason S Daniels
(74) *Attorney, Agent, or Firm* — Ballard Spahr LLP

(57) ABSTRACT

An emergency exit door assembly for a vehicle. The door assembly can include a door panel that is movably coupled to the wall of the vehicle. The door panel can have an inner surface and an outer surface. The door panel can be configured for selective movement between a closed position and an open position in which an opening within the wall is exposed. A headboard component can be incorporated into the door panel, and a bed pedestal within the vehicle can be positioned in proximity to the headboard component when the door panel is in a closed position.

19 Claims, 19 Drawing Sheets

(56) References Cited

U.S. PATENT DOCUMENTS 9,776,482 B2 * 10/2017 Eloff .................... B60J 5/0473

* cited by examiner

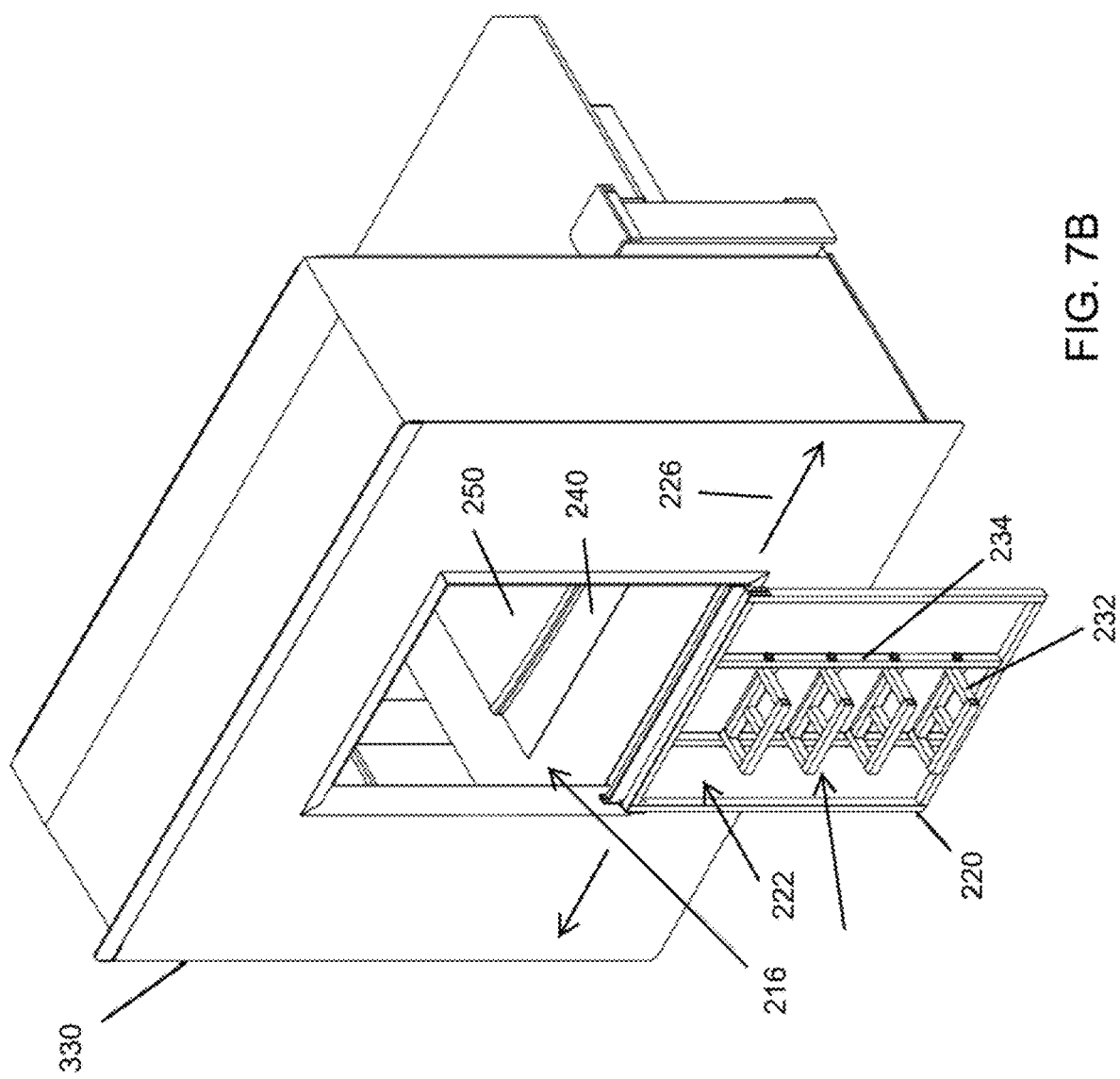

SYSTEMS AND METHODS FOR EGRESS FROM A MOTOR HOME

CROSS-REFERENCE TO RELATED APPLICATION

This application is a continuation of U.S. patent application Ser. No. 15/931,188, filed May 13, 2020, which is a continuation of U.S. patent application Ser. No. 16/151,898, filed Oct. 4, 2018, which claims priority to and the benefit of the filing date of U.S. Provisional Patent Application No. 62/569,642, filed Oct. 9, 2017. Each of these applications is incorporated herein by reference in its entirety.

FIELD

This disclosure relates to systems and methods for egressing from a motor home, as well as to methods of manufacturing such systems.

BACKGROUND

Motorhomes and other recreation vehicles are typically made with a single door. This single door is typically located near the driving area for efficiency. Being the only door, the single door provides access to all spaces of the recreational vehicle. Thus, to access all spaces of the recreational vehicle, a user may have to traverse other living spaces in the vehicle. The requirement to traverse other living spaces can become an issue in the case of an emergency such as a fire. For example, the fire may be near the single door thus making a safe exit from the vehicle dangerous. Thus, there is a need for an emergency exit that provides for emergency egress from the recreational vehicle. Additionally, there is a need for an emergency exit that provides passengers a simple and safe egress route from within the recreational vehicle. Furthermore, there is a need for an emergency exit that can be efficiently integrated with the living space of the recreational vehicle, taking into consideration the recreational vehicle's inherent size constraints.

SUMMARY

Described herein are systems and methods for egressing from a vehicle, such as a motor home. The systems can include an emergency exit door assembly (door assembly) for a vehicle. The vehicle can have a living space that is at least partially enclosed by a wall. The wall can have an interior surface and an exterior surface.

In one example, an emergency exit door assembly can include a first panel that is movably coupled to the wall of the vehicle, wherein the first panel has an inner surface and an outer surface and is configured for selective movement about and between a closed position in which the door panel is received within an egress opening of the wall and an open position in which the egress opening of the wall is exposed. In the closed position, the inner surface of the first panel faces the living space of the vehicle relative to a transverse axis and the outer surface of the first panel is adjacent portions of the exterior surface of the wall that surround the egress opening. In the open position, the inner surface of the first panel faces away from the living space of the vehicle relative to the transverse axis and the outer surface of the first panel faces the living space of the vehicle relative to the transverse axis. The emergency exit door assembly can further include a ladder having a plurality of steps and a frame, wherein the frame is secured to the inner surface of the first panel, and wherein the plurality of steps are secured to the frame. The emergency exit door assembly can further include a second panel that is removably coupled to the wall of the vehicle, wherein the second panel has an inner surface and an outer surface. In a use position, the second panel is coupled to the wall of the vehicle and received within the egress opening such that the inner surface of the second panel faces the living space of the vehicle relative to the transverse axis and the outer surface of the second panel faces away from the living space of the vehicle relative to the transverse axis. The second panel is selectively detachable from the wall of the vehicle to expose the egress opening within the wall. The emergency exit door assembly can further include a primary headboard component secured to the inner surface of the second panel. When the first panel is in the closed position and the second panel is in the use position, the inner surface of the first panel and the outer surface of the second panel enclose the ladder within the egress opening, and the primary headboard component is configured to define at least a portion of a headboard extending along a portion of the interior surface of the wall of the vehicle.

In another example, the door assembly can include a door panel that is movably coupled to the wall of the vehicle. The door panel can have an inner surface and an outer surface. The door panel can be further configured for selective movement about and between a closed position in which the inner surface of the door panel cooperates with the interior surface of the wall to enclose the living space and an open position in which an opening within the wall is exposed. The system can further include a headboard subassembly that includes a primary headboard component. The primary headboard component can be configured for selective positioning in an operative position. When the primary headboard component is in the operative position and the door panel is in the closed position, the primary headboard component can be secured to at least one of: (a) the inner surface of the door panel or (b) the interior surface of the wall of the vehicle. In addition, when the primary headboard component is in the operative position and the door panel is in the closed position, the primary headboard can overlie at least a portion of the inner surface of the door panel to at least partially conceal the presence of the door panel within the living space of the vehicle Optionally, the primary headboard component can be selectively detachable from the vehicle to permit access to the door panel within the living space of the vehicle.

Also disclosed herein are vehicles (e.g., motorhomes) having a door assembly as described herein. Further disclosed are methods of manufacturing a vehicle (e.g., a motorhome) having an exit door assembly as described herein.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE FIGURES

These and other features of the preferred embodiments of the invention will become more apparent in the detailed description in which reference is made to the appended drawings wherein.

Figure 7A:
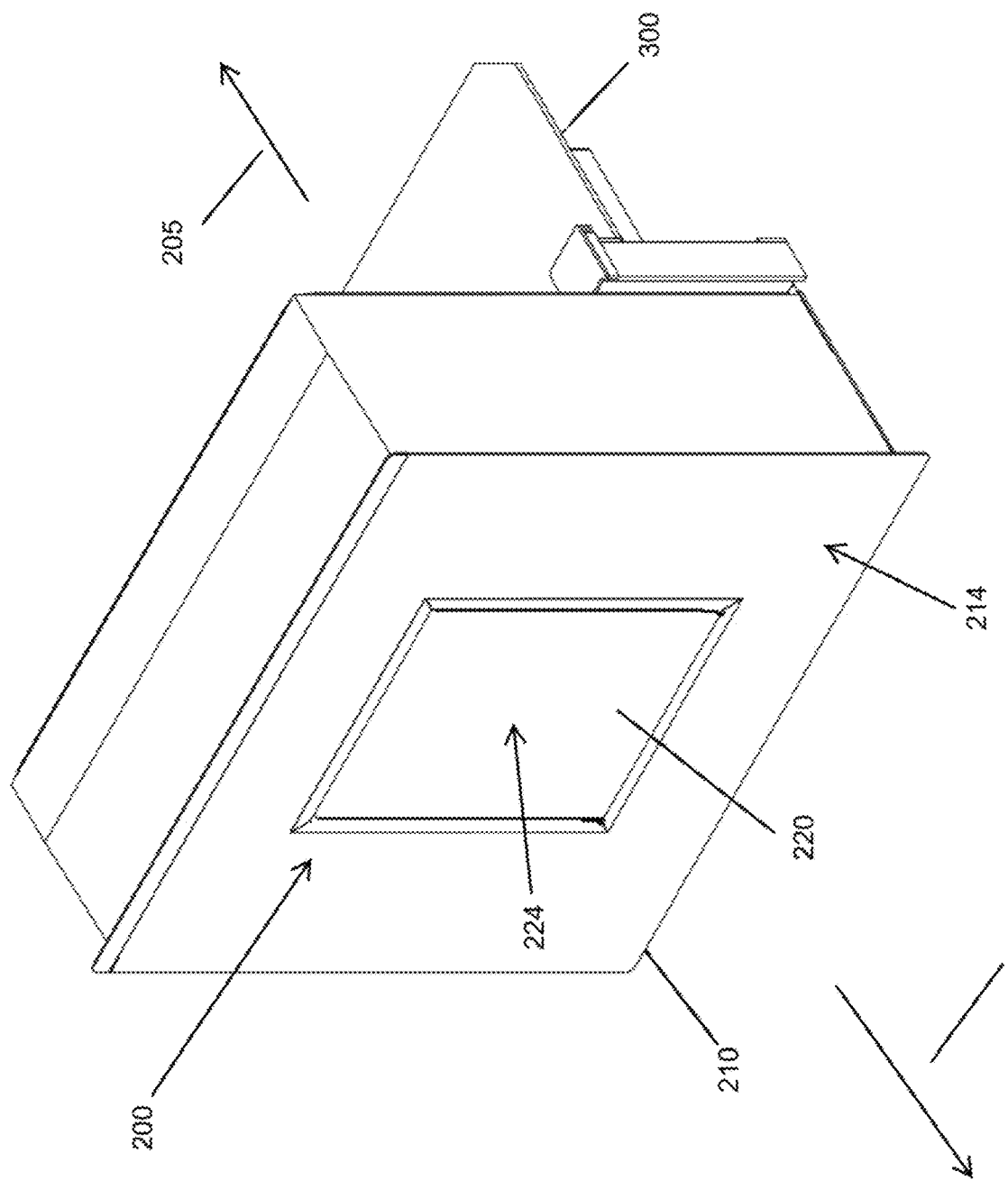
Figure 7C:
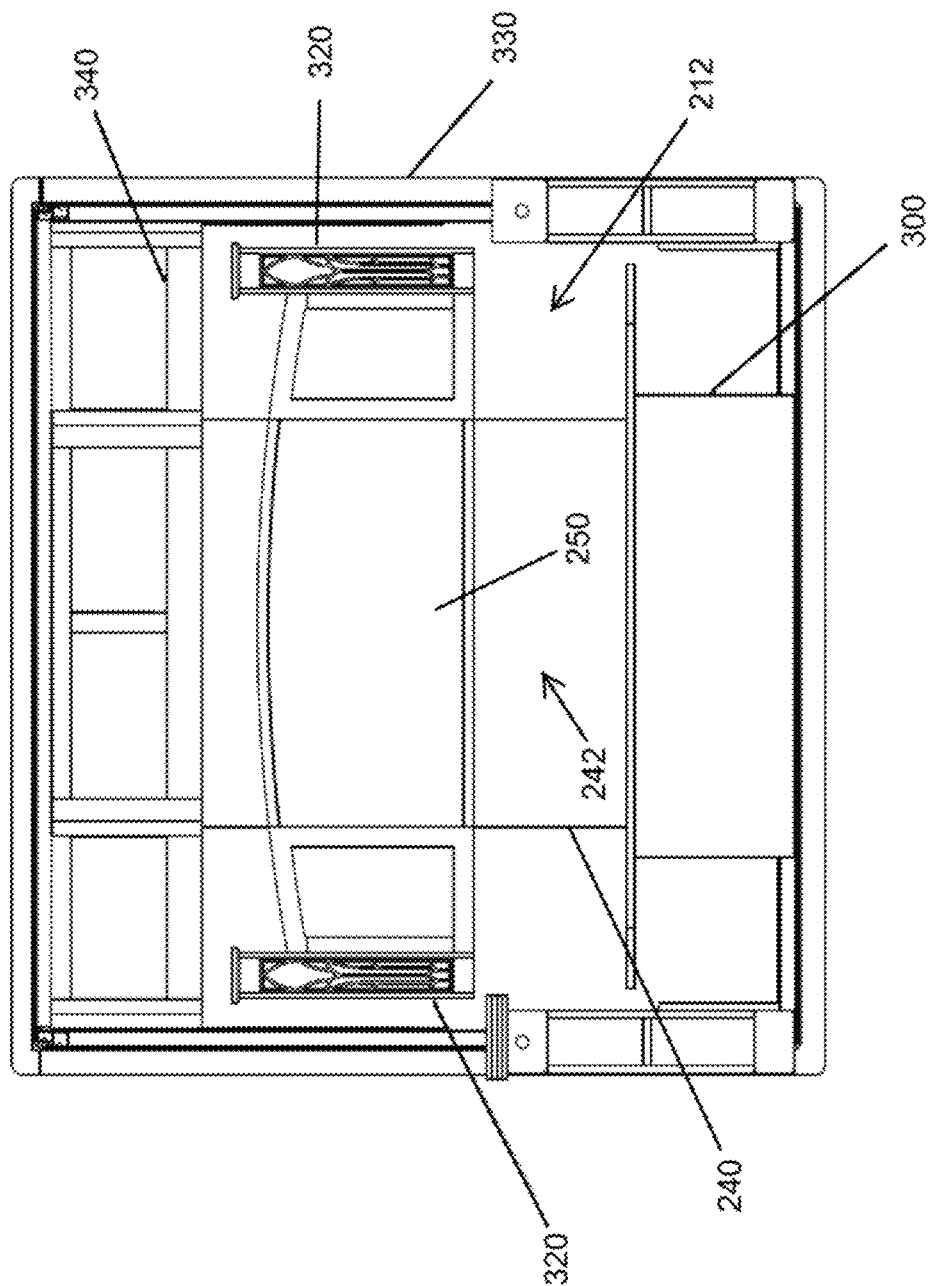
Figure 7D:
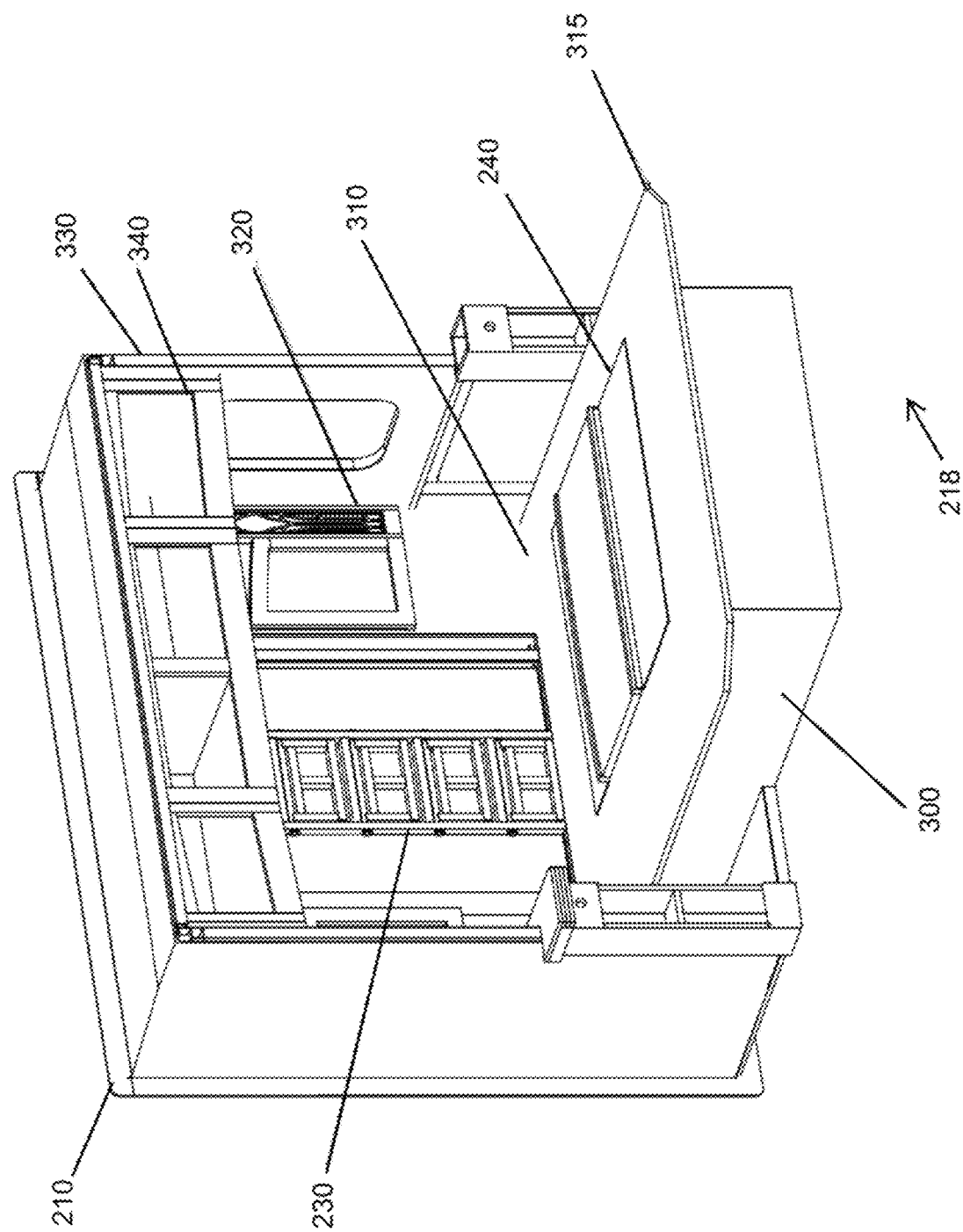

FIGS. 7A-7D depict another exemplary door assembly as disclosed herein. FIG. 7A is a rear perspective view showing a first panel of the door assembly in a closed position as disclosed herein. FIG. 7B is a rear perspective view showing the first panel of the door assembly in an open position as disclosed herein. FIG. 7C is a front view of the door assembly, taken from an interior of a vehicle, with the first panel of the door assembly in a closed position and a second panel of the door assembly in a use position as disclosed herein. FIG. 7D is a front perspective view of the door assembly showing the first panel of the door assembly in a closed position and the second panel removed from its use position as disclosed herein.

Figure 8A:
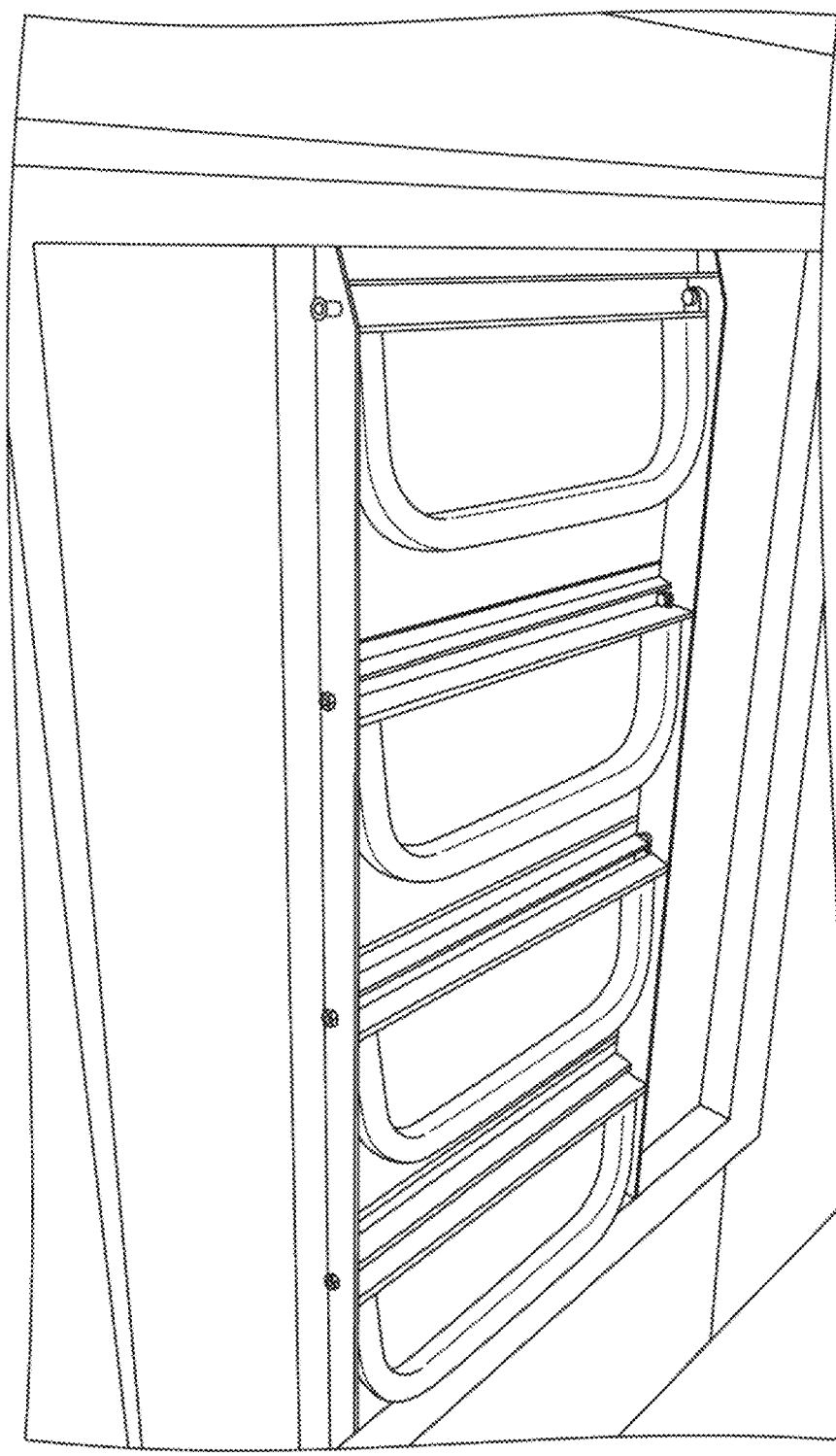
Figure 8B:
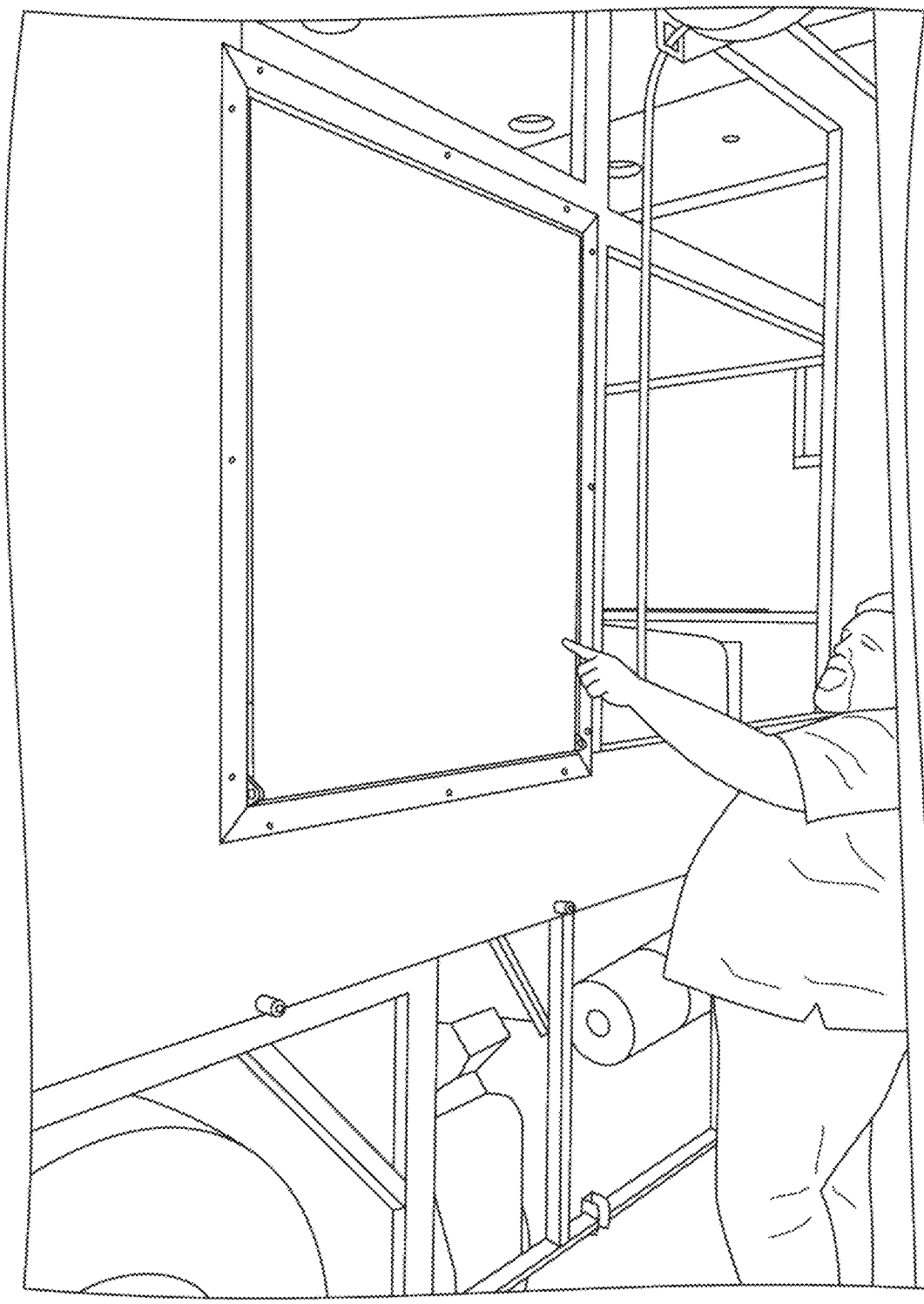
Figure 8C:
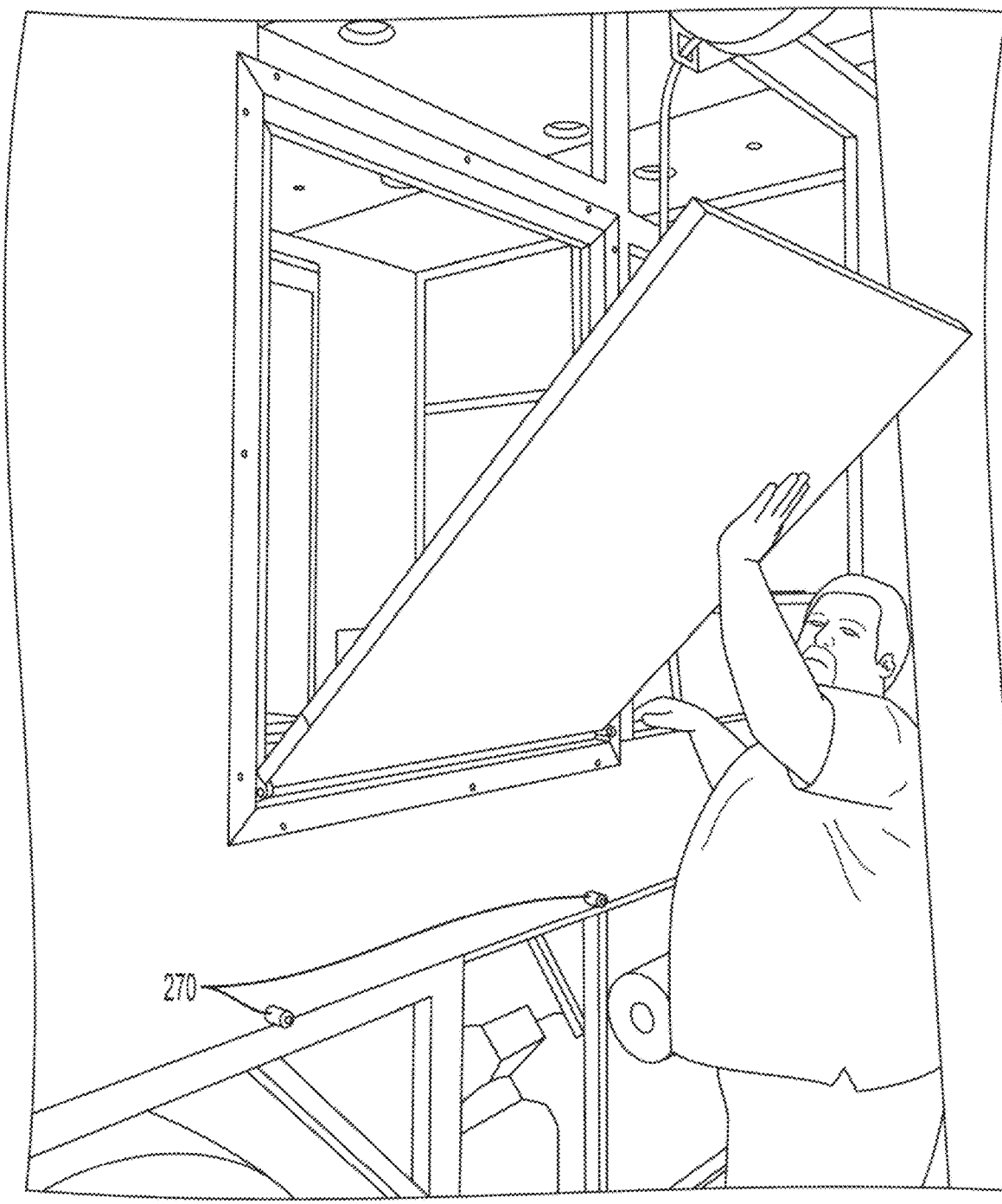
Figure 8D:
Figure 8E:
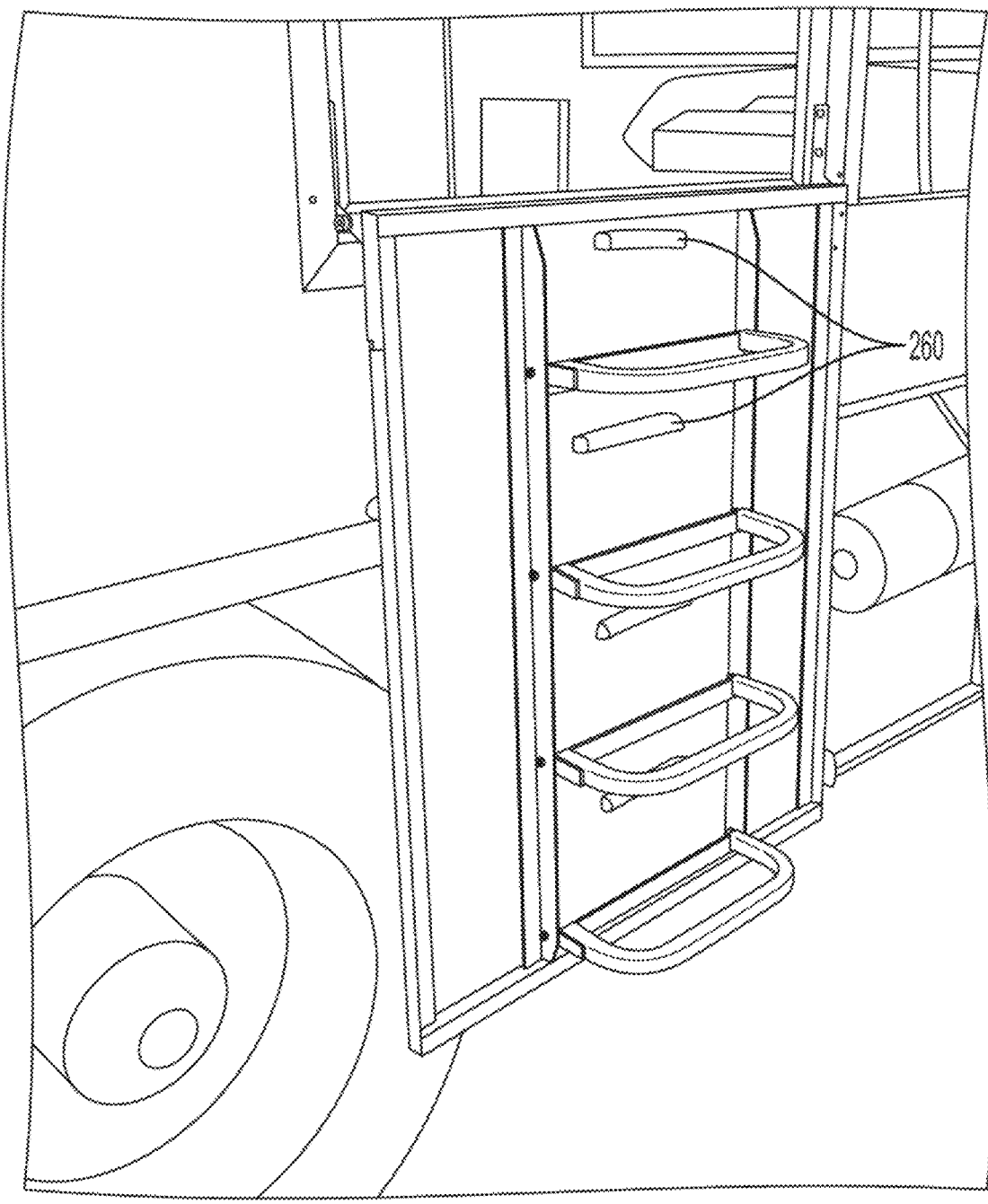
Figure 8F:

FIGS. 8A-8F are images depicting an exemplary door assembly as disclosed herein. FIG. 8A is an image depicting the interior portion of the door assembly when a first panel of the door assembly is in a closed position as disclosed herein. FIG. 8B is an image depicting the exterior portion of the door assembly when the first panel of the door assembly is in a closed position as disclosed herein. FIGS. 8C-8D are images depicting the exterior portion of the door assembly when the first panel of the door assembly is moving toward the open position as disclosed herein. FIG. 8E is an image depicting the first panel of the door assembly in the open position as disclosed herein. FIG. 8F is an image depicting use of the ladder of the door assembly while the first panel of the door assembly is in the open position as disclosed herein.

Figure 9:
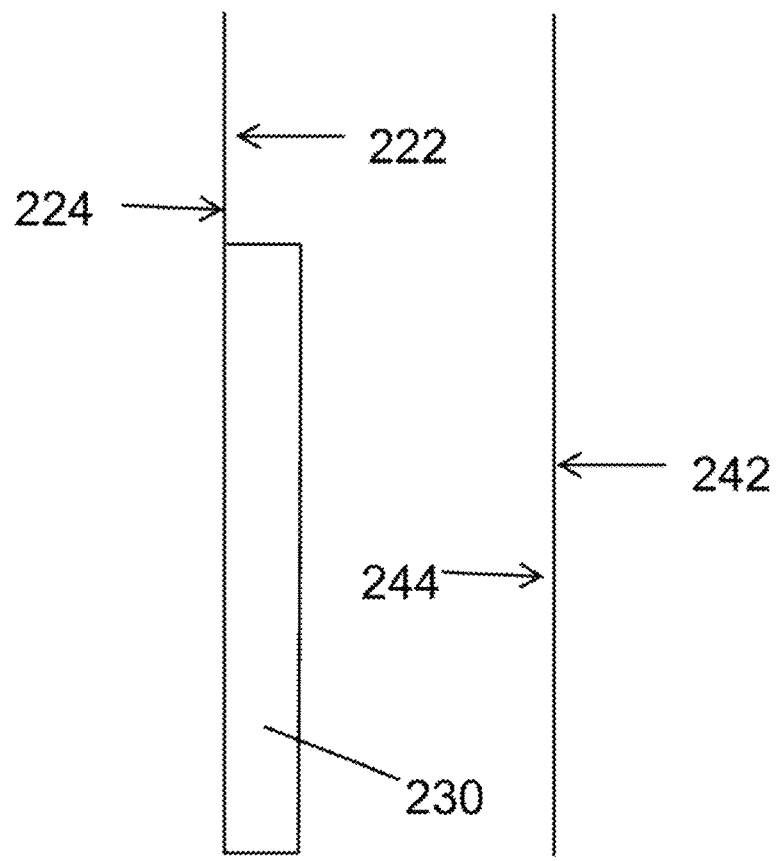

FIG. 9 is a cross-sectional side view of an exemplary door assembly having a first panel in a closed position and a second panel in a use position as disclosed herein. As shown, a ladder secured to the inner surface of the first panel is enclosed between the inner surface of the first panel and the outer surface of the second panel.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the disclosed articles, systems, and methods in their best, currently known embodiments. To this end, those skilled in the relevant art will recognize and appreciate that many changes can be made to the various aspects of the articles, systems, and methods described, herein, while still obtaining the beneficial results of the disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

All publications mentioned herein are incorporated herein by reference to disclose and describe the methods and/or materials in connection with which the publications are cited.

As used in the specification and in the claims, the term "comprising" may include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used throughout, the singular forms "a," "an" and "the" include plural referents unless the context clearly dictates otherwise. Thus, for example, reference to "a surface" can include two or more such surfaces unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Optionally, in some aspects, when values are approximated by use of the antecedent "about" or "substantially," it is contemplated that values within up to 15%, up to 10%, or up to 5% (above or below) of the particularly stated value or characteristic can be included within the scope of those aspects.

It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

Described herein with reference to FIGS. 1-9 is an emergency exit door assembly (door assembly) 100, 200 for a recreational vehicle such as a motorhome. The vehicle can include a living space 114, 218 that is at least partially enclosed by a wall 104, 210. The wall 104, 210 can include an interior surface 106, 212 and an exterior surface 108, 214.

Door Panel Configurations

As shown in FIGS. 1-6D, the door assembly 100 can include a door panel 102. The door panel 102 can be movably coupled to the wall 104 of the vehicle. In an aspect, the door panel 102 can have an inner surface 110 and an outer surface 112 that is configured for selective movement about and between a closed position. As further described herein, the door panel can be selectively oriented in an open position in which an opening within the wall 104 is exposed.

Figure 2A:
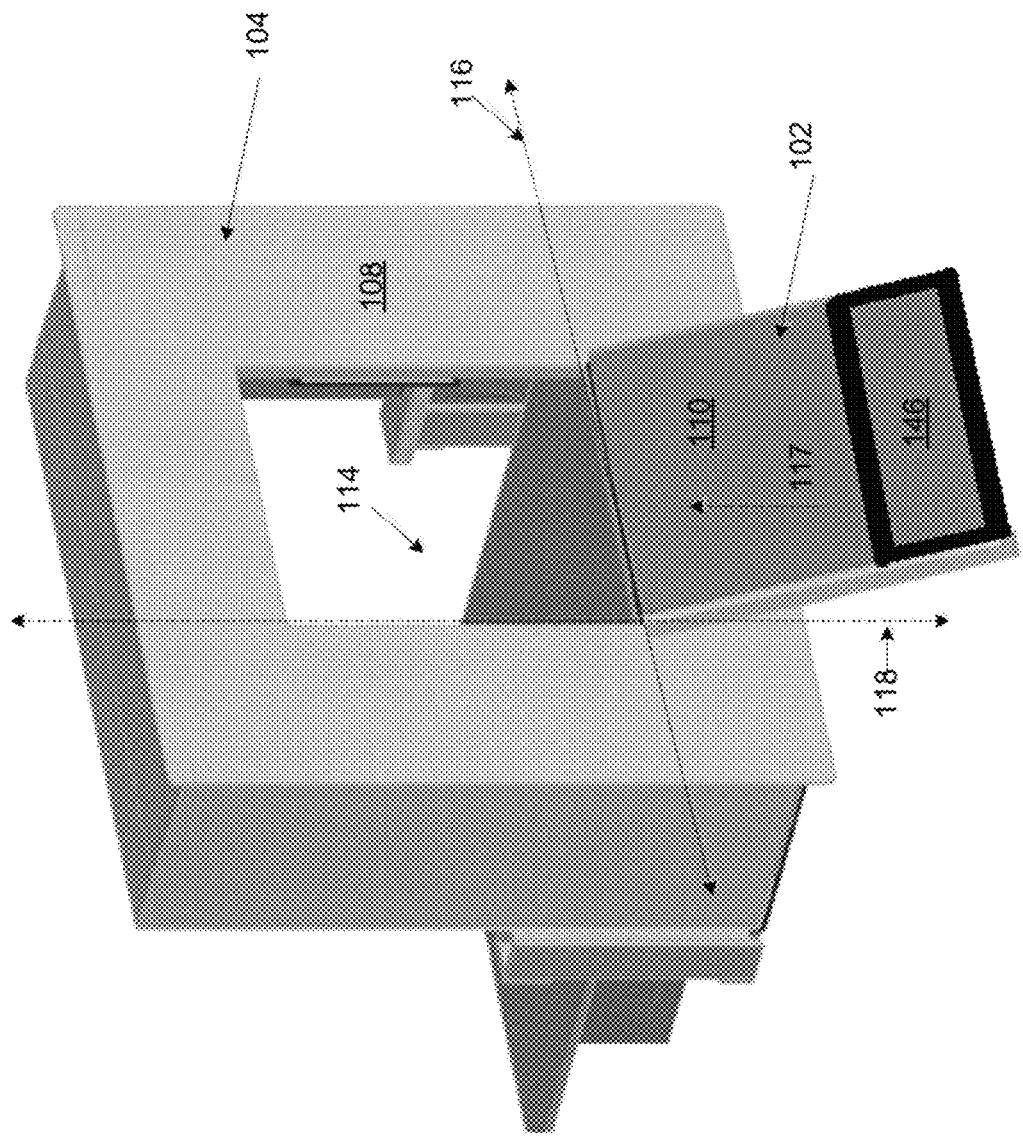
FIG. 2A is a perspective view of the emergency exit door assembly from the outside of the vehicle, wherein the emergency exit door is in an open orientation.
Figure 2B:
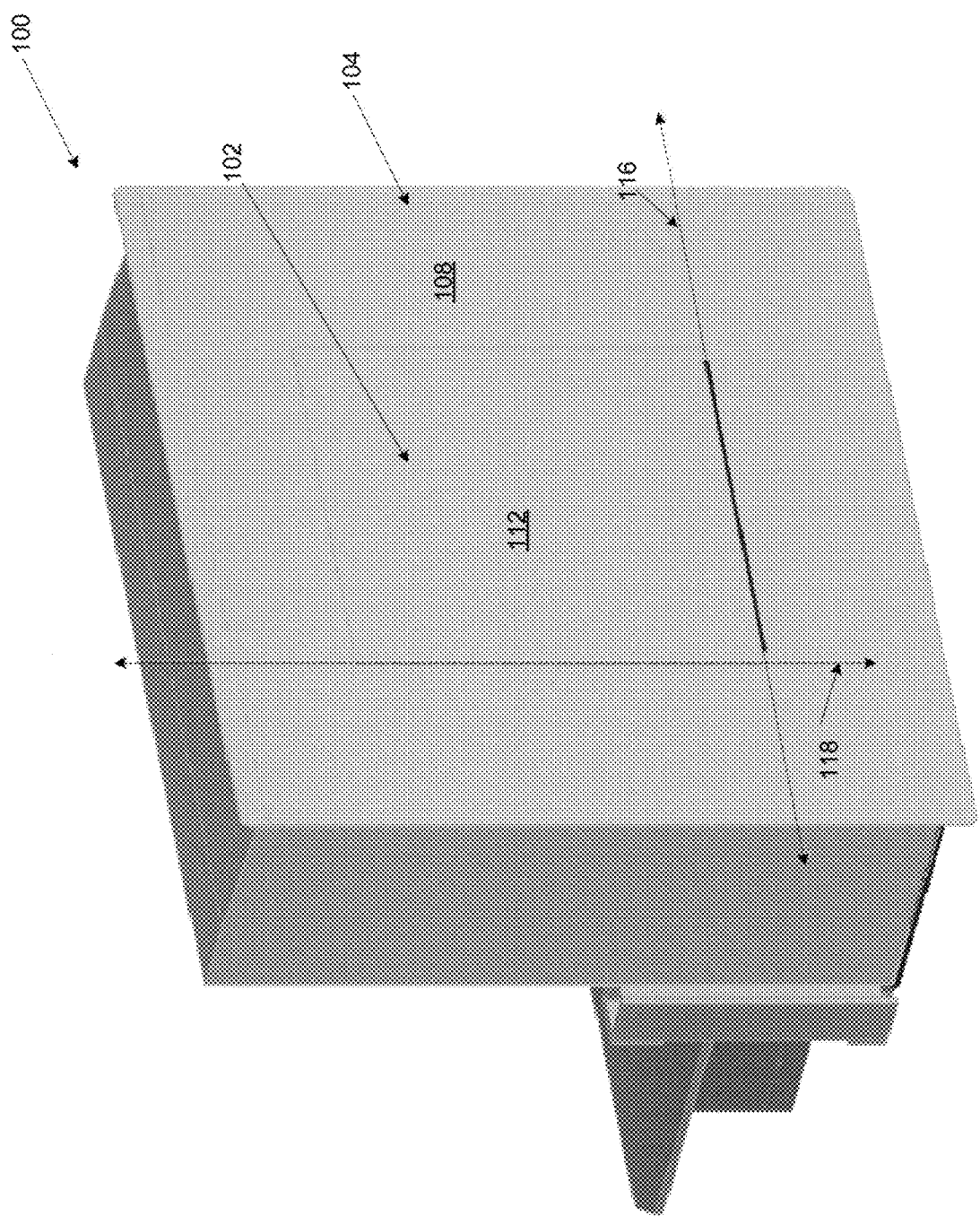
FIG. 2B depicts the emergency exit door assembly from outside of the vehicle in a closed orientation.

Optionally, in various aspects, the inner surface 110 of the door panel 102 cooperates with the interior surface 106 of the wall 104 to enclose the living space 114. As shown in FIG. 2A, in order to ingress and egress the vehicle, the door panel 102 can be configured to open, providing a passage to a space outside of the vehicle. In one aspect, the door panel 102 can be configured for pivotal movement relative to a vertical pivot axis 118 such that the door panel 102 opens and closes in a horizontal direction along a horizontal axis 116. In a further aspect, the door panel 102 can be pivotally coupled to the wall 104. In the alternative, the door panel 102 can be configured for pivotal movement relative to the horizontal pivot axis 116 such that the door panel opens in a downward direction and closes in an upward direction 117. In another aspect, the inner surface 110 of the door panel 102 can define a slide. In the slide configuration, the door can function as a ramp, thus permitting a sliding evacuation from the living space 114 when the door panel 102 is in the open position.

Figure 3B:
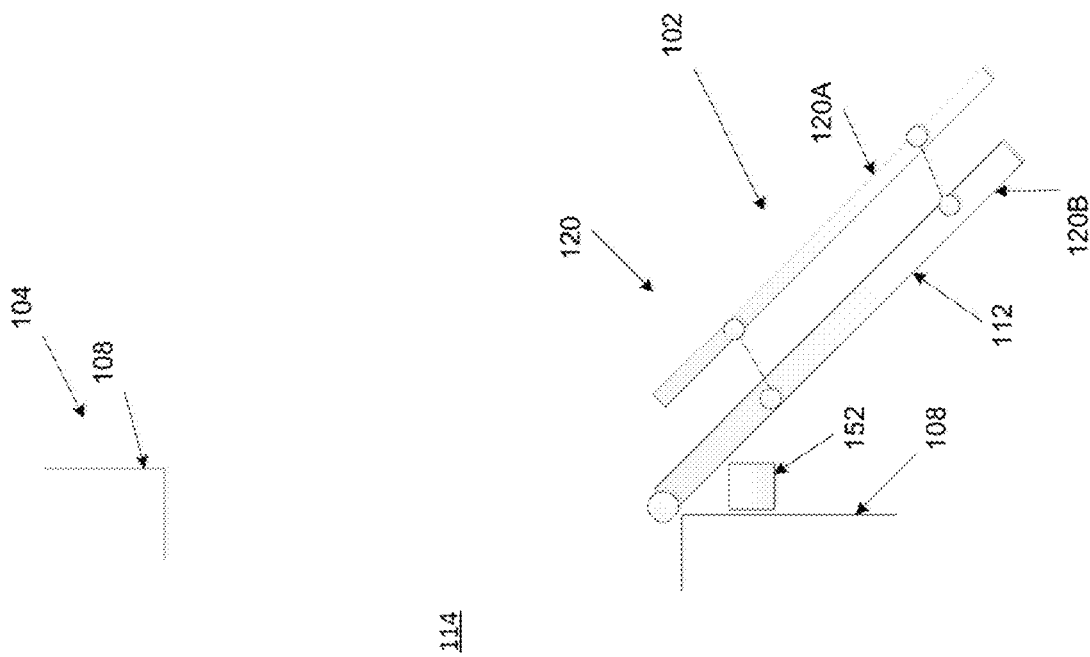
FIG. 3B is a side view of the emergency exit door assembly in an open configuration depicting a ladder in an expanded position.
Figure 3A:
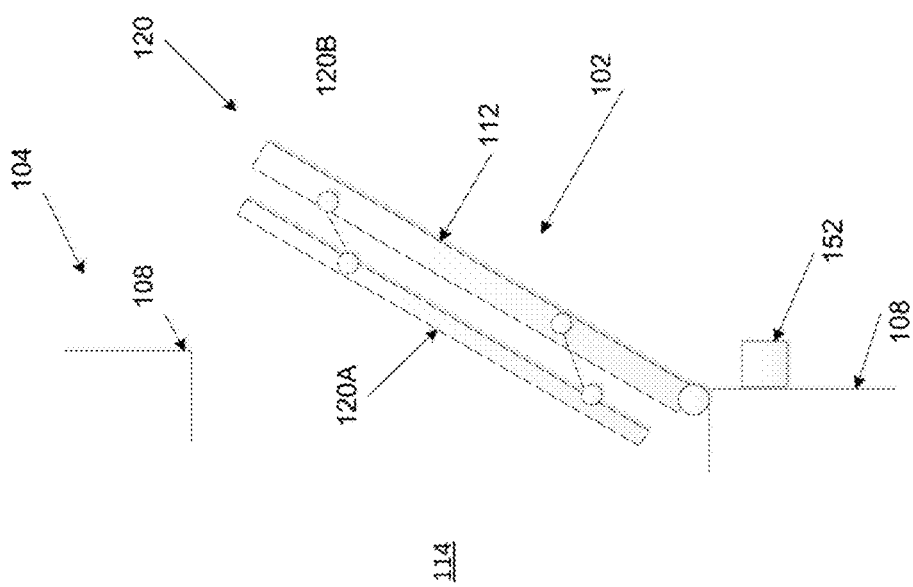
FIG. 3A is a side view of the emergency exit door assembly depicting a ladder in a retracted position.

As shown in FIGS. 3A and 3B, door panel 102 can include an expandable ladder assembly 120 that is moveable about and between a retracted position and an expanded position. When the door panel 102 is in the closed position, the expandable ladder assembly 120 can be in a retracted position. In the closed position, the door panel 102 can be oriented in a vertical position such that egress and ingress are prevented. Thus, when the door transitions from a closed position to an open position, the expandable ladder assembly 120 can transition to an expanded position. In another aspect, the expandable ladder assembly 120 can transition downwardly to a ground surface.

In an aspect, the expandable ladder assembly 120 can comprise a frame portion 120A and a step portion 120B that is pivotally coupled to the frame portion. In the expanded position, the step portion 120B can pivot downwardly relative to the frame portion 120A, and wherein the step portion 120B cooperates with the frame portion 120A to define a ladder configured to permit evacuation from the living space 114. It is further contemplated that the expandable ladder assembly 120 can include counter balancing to allow alternative configurations of the expandable ladder assembly to use gravity as an actuating mechanism to transition the expandable ladder assembly from the retracted to the expanded configuration. For such configurations of the expandable ladder assembly 120 that use gravity as an actuating mechanism, it is contemplated that the expandable ladder assembly can transition from the retracted to the expanded configuration as the door panel pivots downwardly and reaches an angle of approximately 90 degrees or greater (relative to the wall of the vehicle). Such gravity-driven configurations of the expandable ladder assembly 120 can increase the efficiency and speed at which a user can exit the vehicle, particularly in case of an emergency. In yet another alternative, the expandable ladder assembly 120 can include an actuating mechanism (e.g. an actuator, a biasing member, and the like) that causes the expandable ladder to transition from to the retracted configuration to the expanded configuration. For example, in the closed configuration the expandable ladder assembly 120 can be retracted and stored with a spring loaded configuration. Upon releasing the actuating mechanism, a spring force can be applied to the ladder causing the retracted ladder to expand.

As shown in FIGS. 4A-5B, the door assembly 100 can transition between a folded configuration and unfolded configuration. In an aspect, the door assembly 100 can comprise a first panel portion 122 and a second panel portion 124. In a further aspect, both the first panel portion 122 and second panel portion 124 have respective opposing first and second face surfaces.

The first panel portion 122 can be pivotally coupled to the wall 104 at a first pivot location 126. The door assembly 100 can be configured for pivotal movement relative to the horizontal pivot axis 116. The second panel portion 124 can be pivotally connected to the first panel portion 122 at a second pivot location 128. In an aspect, the first pivot location 126 can be spaced distally from the second location. It is further contemplated that pivot location 128 that connects the first panel portion 122 to the second panel portion 124 can comprise a hinged connection.

In an aspect, when the door panel 102 is in the folded configuration the second panel portion 124 can be folded inwardly relative to the first panel portion 122 such that the door panel 102 is positioned in the closed position. The first face surface 134 of the second panel portion 124 can define the inner surface 110 of the door panel 102. The second face surface 136 of the second panel portion 124 and the first face surface 138 of the first panel portion 122 cooperate to define an interior space 142 within the door panel 102; and the second face surface 140 of the first panel portion 122 can define a portion of the exterior surface 108 of the wall 104.

As shown in FIGS. 5A-5D, the door assembly 100 can transition from the folded configuration to the unfolded configuration. The first panel portion 122 can pivot downwardly from the wall 104 such that the door panel 102 is positioned in the open position. During the transition, the second panel portion 124 can pivot outwardly relative to the first panel portion 122. In this configuration, the second face surface 136 of the second panel portion 124 and the first face surface 134 of the first panel portion 122 can cooperate to define a pathway to permit exit from the living space of the vehicle. In a another aspect, the second face surface 136 of the second panel portion 124 and the first face surface 134 of the first panel portion 122 can cooperate to define a slide surface. In a further aspect at least one of the second face surface 136 of the second panel portion 124 or the first face surface of 134 the first panel portion 122 define steps that form at least a portion of a ladder assembly 120.

It is also further contemplated that the door assembly 100 can include a securing mechanism for temporarily securing the door panel in the closed position. For example, the securing mechanism can comprise at least one latch that is configured to selectively secure the door panel in the closed position. In another aspect, the at least one latch can comprise a plurality of latches. In further aspects, the at least one latch can be secured to the inner surface of the vehicle at a location near the opening in the vehicle that is filled by the door panel when the door panel is in the closed position. In these aspects, it is contemplated that each latch member can be configured for selective advancement or retraction relative to an axis that extends from the latch member to the door panel. It is further contemplated that the securing mechanism can further comprise complementary latch engagement portions that are defined by or secured to the inner surface of the door panel. In exemplary aspects, the latch engagement portions can comprise one or more of receptacles, slots, hooks, loops, and the like that are configured to receive at least a portion of a corresponding latch as the latch is advanced toward the door panel. In additional aspects, the at least one latch can be secured to the inner surface of the door panel. In these aspects, it is contemplated that each latch member can be configured for selective advancement or retraction relative to an axis that extends from the latch member to a portion of the inner surface of the vehicle wall surrounding the opening that is filled by the door panel when the door panel is in the closed position. It is further contemplated that the securing mechanism can further comprise complementary latch engagement portions that are defined by or secured to the inner surface of the vehicle at a location near the opening in the vehicle that is filled by the door panel when the door panel is in the closed position. In exemplary aspects, the latch engagement portions can comprise one or more of receptacles, slots, hooks, loops, and the like that are configured to receive at least a portion of a corresponding latch as the latch is advanced toward the portions of the vehicle wall surrounding the opening. Although disclosed herein as comprising latches, it should be appreciated that the securing mechanism can comprise any conventional means for temporarily fastening two components together. For example, it is contemplated that the securing mechanism can comprise one or more of a lock, a chain, a loop, a hook, and the like that are secured to one of the inner surface of the vehicle or the inner surface of the door panel and that are configured for complementary engagement with a corresponding receptacle or other receiving portion that is secured to the other of the inner surface of the vehicle or the inner surface of the door panel.

It is further contemplated that the door assembly 100 can include dampening mechanisms to slow the descent of the door as the door assembly opens toward the ground. For example, a bumper 152 can project from the exterior surface 108 of the wall. The at least one bumper 152 can be configured to prevent contact between the door panel 102 and the exterior surface 108 of the wall when the door panel 102 is positioned in the open position. In another aspect, door assembly 100 can comprise at least one restriction cable secured to and extending between the wall and the door panel. The restriction cable can be configured to limit movement of the door panel 102 when the door panel is moved from the closed position to the open position.

Figure 6A:
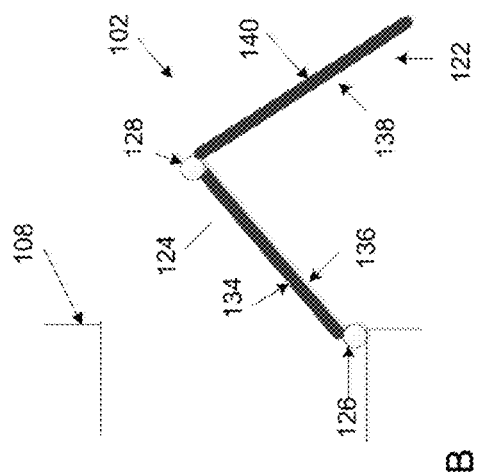
FIGS. 6A-6D are schematic side views of a door assembly moving from a folded configuration to an expanded, unfolded configuration, with the second door panel portion of the door assembly being pivotally coupled to the wall of a vehicle as disclosed herein.
Figure 6B:
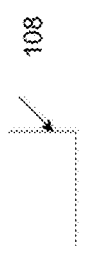
Figure 6B:
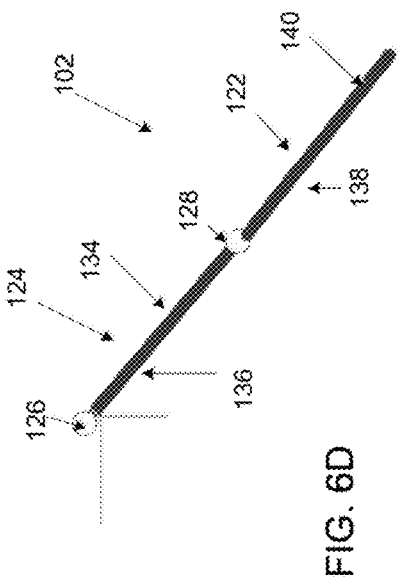
Figure 6C:
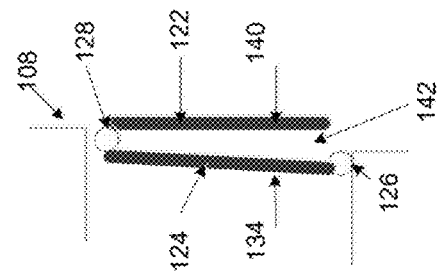
Figure 6D:
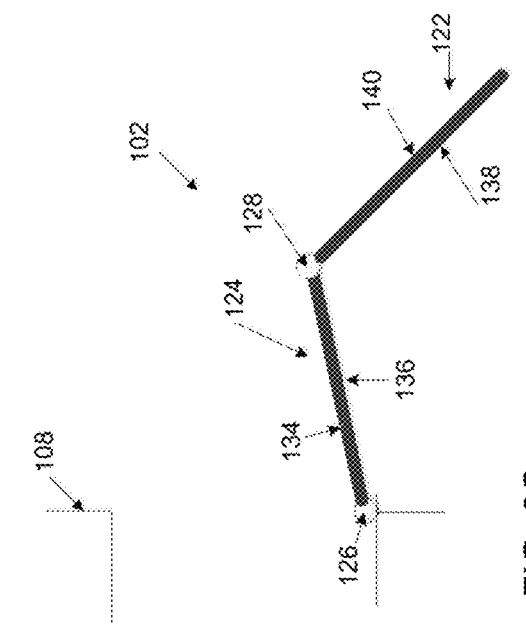

Optionally, as shown in FIGS. 6A-6B, the door assembly 100 can have an alternative transition to the unfolded configuration. In these alternative aspects, the second panel portion 124 (rather than the first panel portion) can be coupled to the wall 104. The second panel portion 124 can pivot downwardly from the wall 104 such that the door panel 102 is positioned in the open position. During the transition, the first panel portion 122 can pivot outwardly relative to the second panel portion 124.

Figure 1:
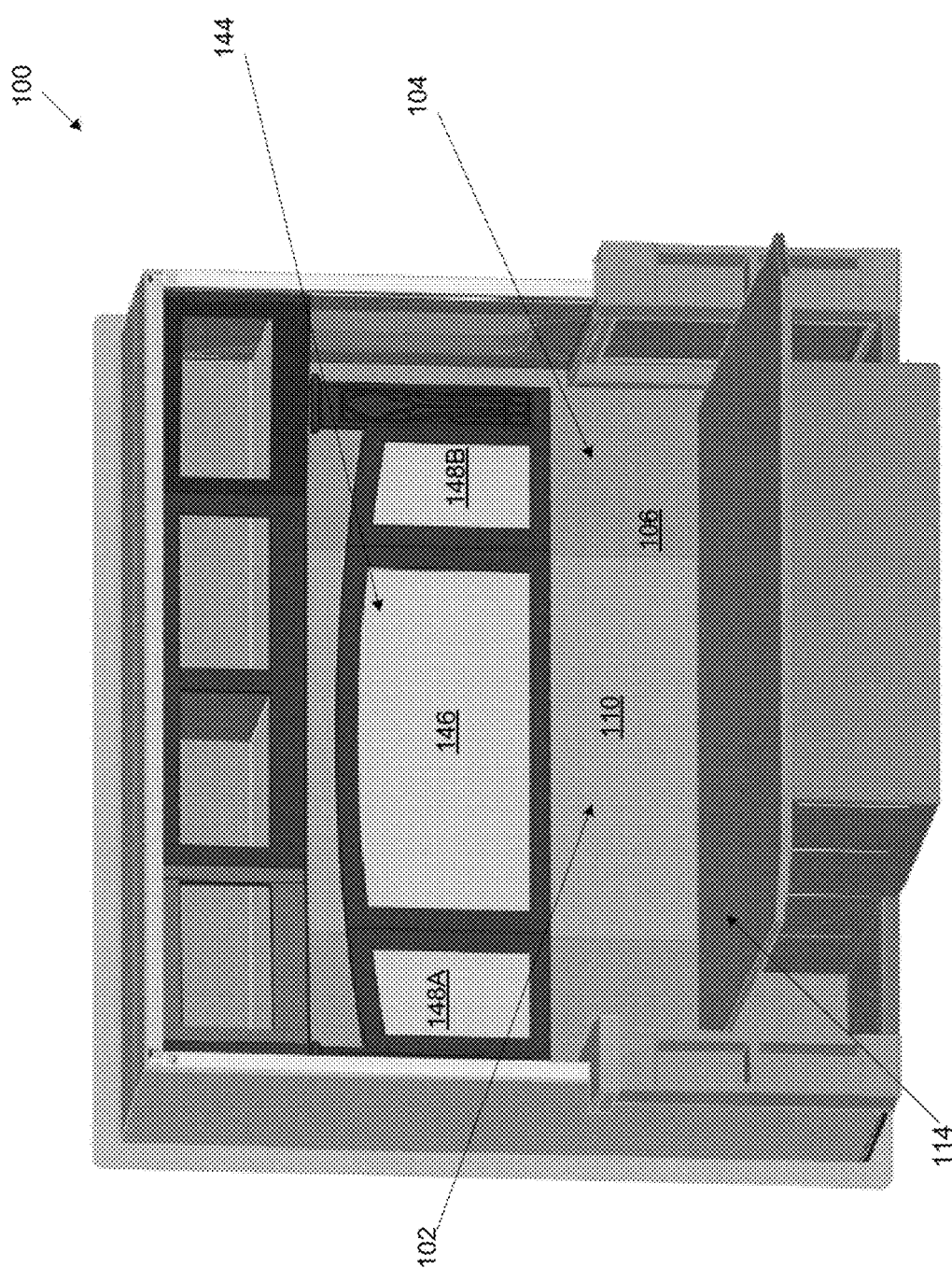
FIG. 1 is a perspective view of the emergency exit door assembly from the living space inside of a recreational vehicle.

Optionally, as shown in FIG. 1, the door assembly 100 can comprise a headboard subassembly 144. The headboard subassembly can comprise a primary headboard component 146. The primary headboard component 146 can be configured for selective positioning in an operative position. When the primary headboard component 146 is in the operative position the door panel is in the closed position. While in the closed position, the primary headboard component 146 can be secured to at least one of: (a) the inner surface 110 of the door panel 102 or (b) the interior surface 106 of the wall 104 of the vehicle. In a further aspect, the primary headboard component 146 can overlie at least a portion of the inner surface 110 of the door panel to at least partially conceal the presence of the door panel 102 within the living space 114 of the vehicle. As shown in FIG. 1, when the primary headboard component 146 is positioned in overlying relation to the door panel, an axis moving outwardly within a horizontal plane from the interior of the vehicle to the exterior of the vehicle will pass through at least a portion of the primary headboard component before passing through the door panel. Optionally, when positioned in overlying relation, the primary headboard component 146 can be spaced from the door panel such that the primary headboard component does not contact the inner surface 110 of the door panel. For example, it is contemplated that the primary headboard component 146 can be secured or coupled to surrounding portions of the wall of the vehicle without contacting the door panel. Alternatively, it is contemplated that the headboard component 146 can contact or be coupled to the door panel when the headboard component 146 overlies the door panel. For example, it is contemplated that the primary headboard component 146 can be secured (optionally, permanently secured) to the inner surface 110 of the door panel. Optionally, in order to reveal the door panel 102 during egress from the vehicle, the primary headboard component 146 can be selectively detachable from the vehicle to permit access to the door panel within the living space of the vehicle. For example, the primary headboard component 146 can be selectively detachable via an arrangement of one or more fixtures, couplings, or fasteners attached to the rear of the headboard component. Optionally, the fixtures, couplings, or fasteners can be received by a corresponding coupling on the wall such that the fixtures and couplings can support the weight to the headboard assembly. In other optional aspects, it is contemplated that the primary headboard component 146 can be permanently secured to the inner surface of the door panel such that the primary headboard component remains attached to the door panel during movement of the door panel as disclosed herein.

In another aspect, the headboard subassembly 144 can comprise complementary headboard portions 148A, 148B positioned on opposing sides of the opening within the wall 104. When the door panel is positioned in the closed position, the primary headboard component 146 can be in the operative position and the complementary headboard portions 148A and 148B cooperate with the primary headboard component 146 to define a headboard. In yet another aspect, the first face surface 134 of the second panel portion can define a portion of a headboard assembly 144.

Door Assemblies Having First and Second Panels

Optionally, in various exemplary aspects and as shown in FIGS. 7A-9, it is contemplated that the emergency exit door assembly 200 can comprise first and second panels 220, 240. In these aspects, the living space 218 of the vehicle can be at least partially enclosed by a wall 210. As previously described, the wall can have an interior surface 212 and an exterior surface 214.

In one aspect, and with reference to FIGS. 7A-7D, the first panel 220 can be movably coupled to the wall 210 of the vehicle. In this aspect, the first panel 220 can have an inner surface 222 and an outer surface 224. In use, the first panel 220 can be configured for selective movement about and between a closed position in which the first panel is received within an egress opening 216 of the wall 210 and an open position in which the egress opening of the wall is exposed (with the door assembly being, sufficiently displaced from the closed position to permit selective entry or exit through the egress opening). In the closed position, the inner surface 222 of the first panel 220 can face the living space 218 of the vehicle relative to a transverse axis 205 and the outer surface 224 of the first panel can be adjacent to portions of the exterior surface 214 of the wall 210 that surround the egress opening 216. As used herein, the term "adjacent" can include, but does not require, direct contact; for example, it is contemplated that a small void area or gap can be provided between the first panel 220 and the exterior surface 214 of the wall 210 when the first panel is in the closed position. In the open position, as shown in FIGS. 7B and 8E-8F, the inner surface 222 of the first panel 220 can face away from the living space 218 of the vehicle relative to the transverse axis 205, and the outer surface 224 of the first panel can face toward the living space of the vehicle relative to the transverse axis. In one exemplary configuration, the first panel 220 can be pivotally coupled to the wall 210, and the first panel can be configured for pivotal movement relative to a horizontal pivot axis 226 such that the first panel opens (moves from the closed position towards the open position) in a downward direction and closes (moves from the open position towards the closed position) in an upward direction. Optionally the first panel 220 can be pivotally coupled to the wall 210 of the vehicle using a hinged connection. When used herein in connection with the first panel 220, the terms "inner surface" and "outer surface" are indicative of the relative orientations of the two surfaces of the first panel when the first panel is in the closed position.

In another aspect, the emergency exit door assembly 200 can further comprise a ladder having a plurality of steps 232 and a frame 234. In this aspect, the frame 234 can be secured to the inner surface 222 of the first panel 220, and the plurality of steps 232 can be secured to the frame. Optionally, in exemplary aspects, the steps 232 of the ladder are moveable about and between a retracted position and an expanded position. In these exemplary aspects, when the first panel 220 is in the closed position, the steps 232 are in the retracted position, and when the first panel is in the open position, the steps are in the expanded position. In a further aspect, in the expanded position, the steps 232 of the ladder 230 can extend downwardly from the egress opening 216 in the wall 210 toward a ground surface. Optionally, in another aspect, the steps 232 of the ladder 230 can be pivotally coupled to the frame 234 of the ladder. In this aspect, in the expanded position, the steps 232 can pivot downwardly relative to the frame 234. When returning to the retracted position, the steps 232 can pivot upwardly relative to the frame 234. In further aspects, when the steps 232 are in the expanded position, the steps can be oriented perpendicularly or substantially perpendicularly to the inner surface 222 of the first panel 220.

In exemplary aspects, the frame 234 of the ladder 230 can comprise first and second vertical frame elements (e.g., brackets) that are mounted to the inner surface 222 of the first panel 220, with the first and second vertical frame elements extending in parallel along at least a portion of a length of the first panel 220. In these aspects, it is contemplated that each step 232 can be positioned between the first and second vertical frame elements, with each step having opposing end portions that are respectively pivotally coupled to the first and second vertical frame elements using conventional pivoting fastening connections. It is further contemplated that each step 232 can be configured for pivotal, movement about a pivot axis that is aligned with a longitudinal axis of the pin that couples the step to the vertical frame elements. It is still further contemplated that the pivot axis of each step 232 can be parallel or substantially parallel to the horizontal pivot axis 226 of the first panel 220. Optionally, the first and second vertical frame elements can be provided as portions of a rectangular frame that is mounted to the inner surface 222 of the first panel 220.

In additional aspects, the ladder 230 can further comprise a plurality of supports (e.g., horizontal braces) that are rigidly fixed to, and span between, the first and second vertical frame elements. In these aspects, it is contemplated that each step 232 can comprise a base portion that defines at least one stop surface that is configured to engage at least one corresponding stop surface of a respective support. It is contemplated that each support can be positioned directly underneath a corresponding step of the ladder 230. Upon engagement between the stop surfaces of the step and the support, the support can prevent further pivotal motion of the step 232, thereby maintaining each step in a desired perpendicular orientation relative to the first panel 220, even upon placement of weight on the step. In one exemplary configuration, it is contemplated that the base portion of the support can have an L-shape that is complementary to a support having a rectangular or square cross-sectional shape. In exemplary aspects, each step 232 can further comprise a step portion that extends outwardly from the base portion of the step when the step is in the expanded position. In these aspects, it is contemplated that the step portion can have any desired shape or configuration. However, in exemplary aspects, and as shown in FIGS. 8B-8F, it is contemplated that the step portion of at least one step 232 can comprise at least one support bar that cooperates with the base portion of the step to define a central opening within each step. For example, in one optional configuration, the step portion of at least one step 232 can comprise a single support bar with an arcuate or curved profile that cooperates with the base portion of the step to define a central opening within the step.

In a further aspect, the second panel 240 of the emergency exit door assembly 200 can be removably coupled to the wall 210 of the vehicle. In this aspect, the second panel 240 can have an inner surface 242 and an outer surface 244. In a use position, the second panel 240 can be coupled to the wall 210 of the vehicle and received within the egress opening 216 such that the inner surface 242 of the second panel faces the living space 218 of the vehicle relative to the transverse axis 205 and the outer surface 244 of the second panel faces away from the living space of the vehicle relative to the transverse axis. As further described herein, the second panel 240 can be selectively detachable from the wall 210 of the vehicle to expose the egress opening 216 within the wall.

In an additional aspect, the emergency exit door assembly 200 can further comprise a primary headboard component 250 secured to the inner surface 242 of the second panel 240. Optionally, it is contemplated that the primary headboard component 250 can be selectively detachable from the inner surface 242 of the second panel 240. Alternatively, the primary headboard component 250 can be permanently secured to the inner surface 242 of the second panel 240. As depicted in FIGS. 7B-7D, the primary headboard component 250 can project from the inner surface 242 of the second panel 240 (toward the living space). It is contemplated that the primary headboard component 250 can comprise any conventional headboard material, including, for example and without limitation, wood, synthetic wood, laminate materials, plastic, cloth, leather, vinyl, and combinations thereof. Optionally, the primary headboard component 250 can comprise at least one padding or cushioning layer that is enclosed by an outer layer. As shown in FIG. 7C, it is contemplated that the primary headboard component 250 can have respective top and bottom edge portions that project beyond adjacent portions of the primary headboard component.

In exemplary aspects, when the first panel 220 is in the closed position and the second panel 240 is in the use position, the inner surface 222 of the first panel and the outer surface 244 of the second panel can enclose the ladder 230 within the egress opening 216, and the primary headboard component 250 can be configured to define at least a portion of a headboard extending along a portion of the interior surface 212 of the wall of the vehicle. In use, when the first panel 220 is in the closed position and the second panel 240 is in the use position, the second panel can overlie at least a portion of the inner surface 222 of the first panel to at least partially conceal the presence of the first panel and the ladder 230 within the living space 218 of the vehicle.

It is further contemplated that the door assembly 200 can include at least one securing mechanism for temporarily securing the first panel 220 in the closed position and/or the second panel 240 in the use position. For example, a first securing mechanism can comprise at least one latch that is configured to selectively secure the first panel in the closed position, and a second securing mechanism can comprise at least one latch that is configured to selectively secure the second panel in the use position. In use, it is contemplated that such a first securing mechanism can be accessed following detachment of the second panel 240 from the wall 210 as further disclosed herein. In another aspect, the at least one latch of each securing mechanism can comprise a plurality of latches.

The following description relates to an exemplary securing mechanism for the first panel 240; however, it is contemplated that a corresponding securing mechanism can be provided at the interface between the inner surface 222 of the first panel 220 and surrounding portions of the wall within the egress opening. In exemplary aspects, the at least one latch of the securing mechanism can be secured to the interior surface 212 of the wall 210 of the vehicle at a location near the opening 216 in the vehicle that is filled by the second panel when the second panel is in the use position. In these aspects, it is contemplated that each latch member can be configured for selective advancement or retraction relative to an axis that extends from the latch member to the first panel. It is further contemplated that the securing mechanism can further comprise complementary latch engagement portions that are defined by or secured to the inner surface 242 of the second panel 240. In exemplary aspects, the latch engagement portions can comprise one or more of receptacles, slots, hooks, loops, and the like that are configured to receive at least a portion of a corresponding latch as the latch is advanced toward the second panel. In additional aspects, the at least one latch can be secured to the inner surface of the second panel. In these aspects, it is contemplated that each latch member can be configured for selective advancement or retraction relative to an axis that extends from the latch member to a portion of the interior surface 212 of the vehicle wall 210 surrounding the opening 216 that is filled by the second panel when the second panel is in the use position. It is further contemplated that the securing mechanism can further comprise complementary latch engagement portions that are defined by or secured to the interior surface 212 of the wall 210 of the vehicle at a location near the opening 216 in the vehicle that is filled by the second panel 240 when the second panel is in the use position. In exemplary aspects, the latch engagement portions can comprise one or more of receptacles, slots, hooks, loops, and the like that are configured to receive at least a portion of a corresponding latch as the latch is advanced toward the portions of the vehicle wall 210 surrounding the opening 216. Although disclosed herein as comprising latches, it should be appreciated that the securing mechanism can comprise any conventional means for temporarily fastening two components together. For example, it is contemplated that the securing mechanism can comprise one or more of a lock, a chain, a loop, a hook, and the like that are secured to one of the interior surface 212 of the vehicle or the inner surface 242 of the second panel 240 and that are configured for complementary engagement with a corresponding receptacle or other receiving portion that is secured to the other of the interior surface of the vehicle wall or the inner surface of the second panel.

In further exemplary aspects, it is contemplated that the interior surface 212 and the exterior surface 214 of the wall 210 can comprise respective door frames that surround the egress opening 216. In these aspects, it is contemplated that the door frames can define recessed areas that are configured to receive the first and second panels in their respective closed and use positions such that the panels are substantially flush or in alignment with surrounding portions of the interior and exterior surfaces of the wall 210.

Optionally, in additional aspects, and as shown in FIG. 8E, the emergency exit door assembly 200 can further comprise at least one panel bumper 260 secured to the inner surface 222 of the first panel 220. In these aspects, it is contemplated that the at least one panel bumper 260 can be configured to prevent the steps 232 of the ladder 230 from contacting the inner surface 222 of the first panel 220 when the steps are in the retracted position. For example, when each step comprises a base portion and a support portion as described above, it is contemplated that the support portion of a step can contact at least a portion of a respective panel bumper 260 when the step is in the retracted position.

Optionally, in further aspects, and as shown in FIG. 8C, the emergency exit door assembly 200 can further comprise at least one wall bumper 270 projecting from the exterior surface 214 of the wall. In these aspects, it is contemplated that the at least one wall bumper 270 can be configured to prevent contact between the outer surface 224 of the first panel 220 and the exterior surface 214 of the wall 210 when the first panel is positioned in the open position.

Motorhome Configurations

As shown in FIGS. 2A and 7A-8F, the exit door assembly 100, 200 can be integrated into a motorhome. In an aspect, the motorhome can have a plurality of inner walls. Optionally, as shown in FIGS. 7B-7D (and similarly depicted in FIG. 2A), the motorhome can include a bed pedestal 300 having a head portion 310 positioned proximate to a first inner wall 210 of the motorhome. The word "proximate" as used herein means that two objects are spatially close (optionally, positioned in physical contact or spaced apart by a distance ranging from about 0 inches to about 24 inches, from about 0 inches to about 12 inches, or from about 0 inches to about 6 inches). Optionally, when the head portion 310 is proximate the first inner wall 210 of the motorhome, the head portion 310 can be physically coupled to (and optionally, contact) a portion of the first inner wall 210. However, in other aspects, the head portion 310 does not contact the first inner wall 210 of the motorhome. The bed pedestal 300 can have any conventional configuration allowing a user to lie in a reclined or prone position. In use, it is contemplated that the bed pedestal 300 can be configured to support a mattress. The inner wall 210 of the motorhome can include an emergency exit door assembly 100, 200 as disclosed herein. Optionally, portions of the bed pedestal 300 other than the head portion (e.g., a side portion extending between the head portion and a foot portion of the bed pedestal) can be positioned proximate to a first inner wall 104, 210 of the motorhome (and the inner surface 110, 222 of the first panel 220) such that the door assembly 100, 200 is easily accessible from a sleeping location within the motorhome.

It is further contemplated that the motorhome can include a slide room 330 that defines the first inner wall 210 of the motorhome. As is known in the art, a slide room can be a room or room portion that can be moved from a retracted position while the vehicle is being driven to an extended position when the vehicle is stationary to provide additional internal space. The slide-room 330 can comprise a floor, a roof, an external end wall and one or more side walls (typically generally perpendicular to the vehicle side wall). These components are typically made of frame members and wall panels. In the retracted position, the roof, floor and side walls can be typically concealed from exterior view. Various mechanisms are known for moving a slide-room between its expanded and retracted positions. A slide-room typically can have an electric motor operatively coupled to a set of gears, cables, chains, and/or hydraulic arms configured to move the slide-room from its retracted position to its expanded position and retracted position. The inner wall can also include structural features and components that provide additional storage within or on the inner wall. For example, the inner wall can include at least one cabinet that is secured to the inner wall and positioned above the emergency exit door assembly.

Figure 4A:
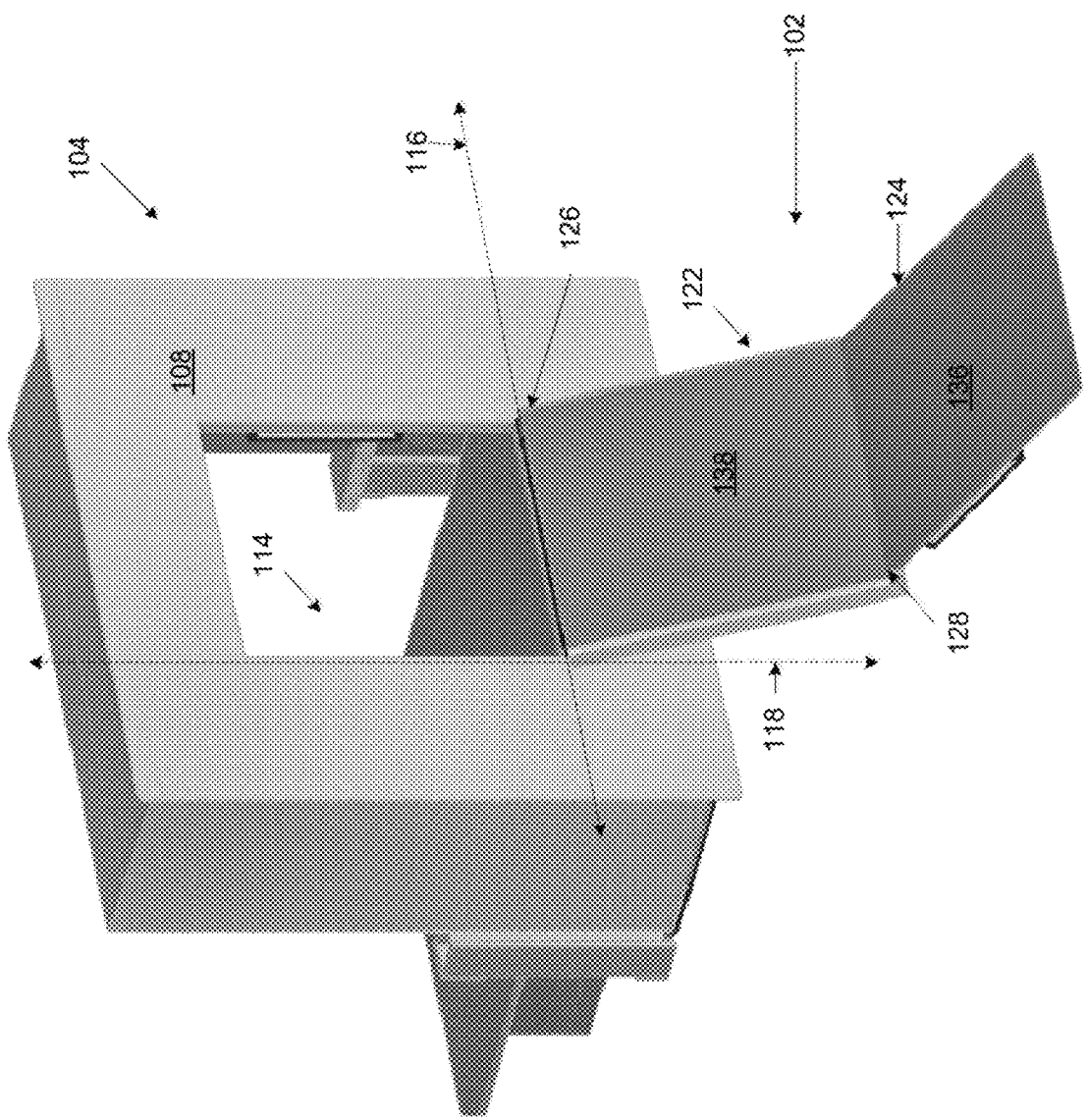
FIG. 4A is an isolated perspective view of the emergency exit door assembly from the outside of the vehicle, wherein the emergency exit door is in an unfolded configuration.
Figure 4B:
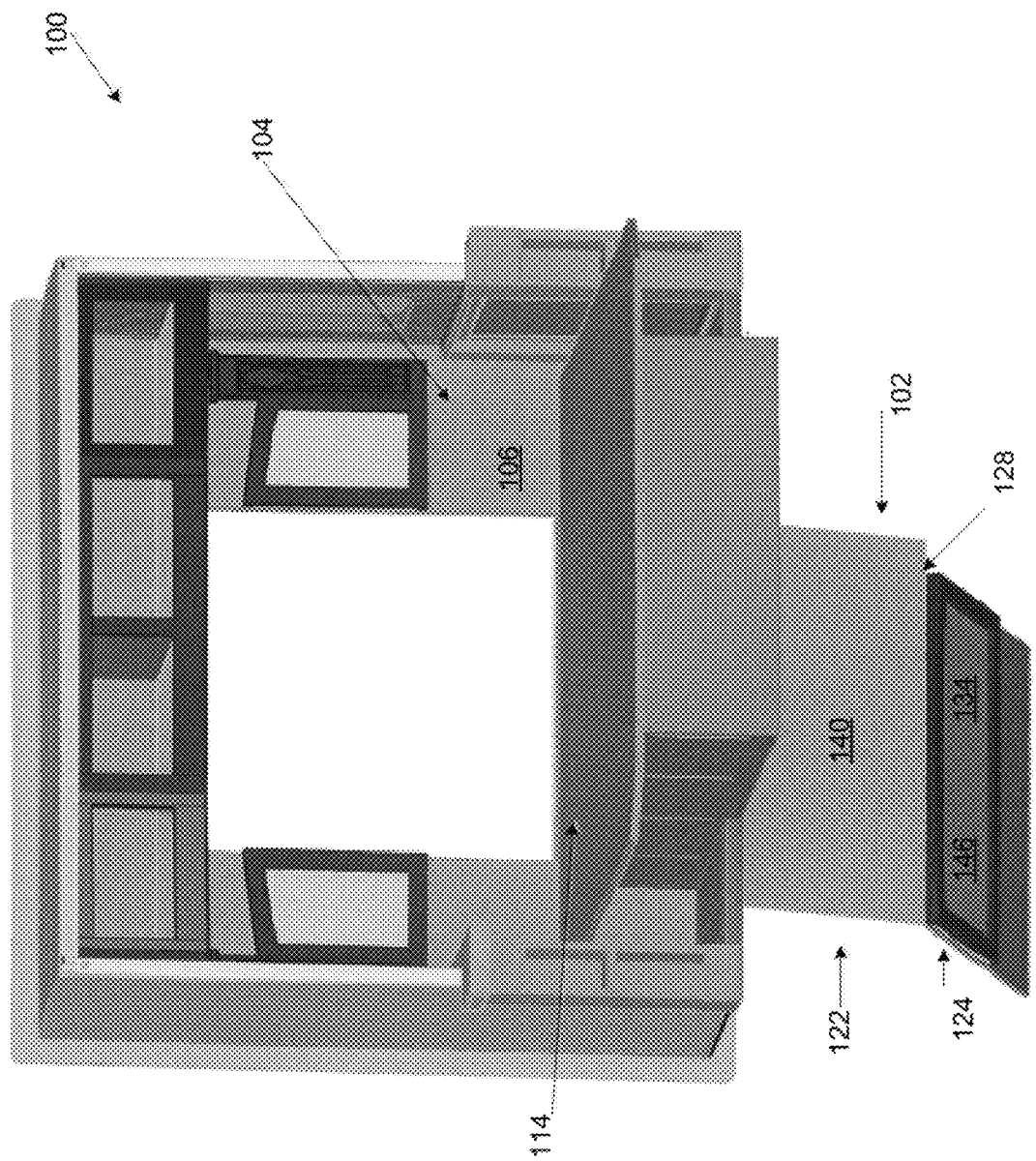
FIG. 4B depicts the emergency exit door assembly of FIG. 4A from the inside of the vehicle.
Figure 5A:
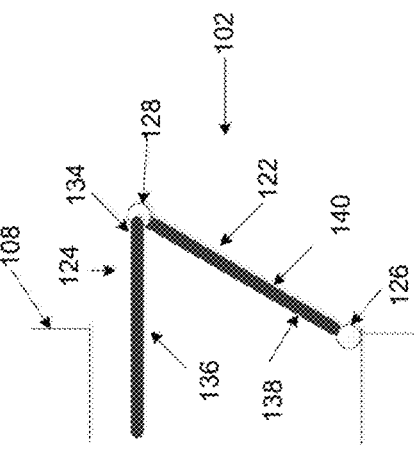
FIGS. 5A-5D are schematic views of a door assembly moving from a folded configuration to an expanded, unfolded configuration, with the first door panel portion of the door assembly being pivotally coupled to the wall of a vehicle as disclosed herein.
Figure 5B:
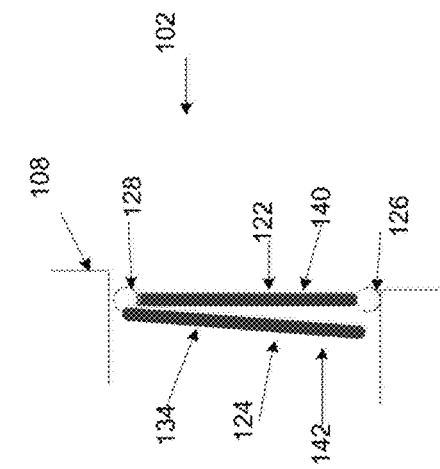
Figure 5C:
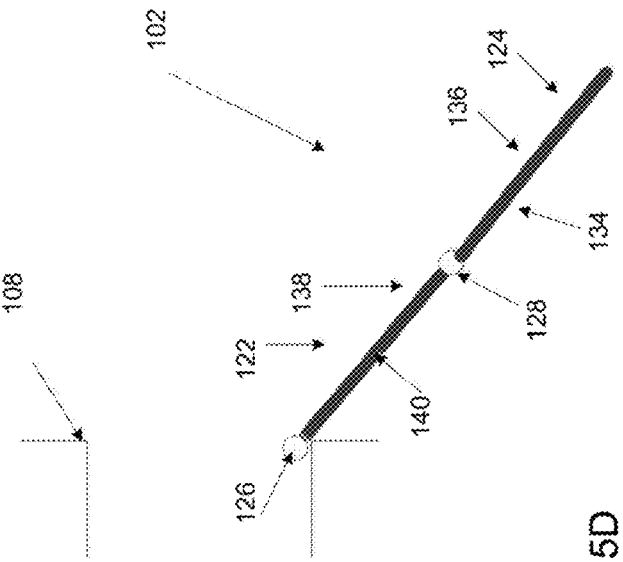
Figure 5D:
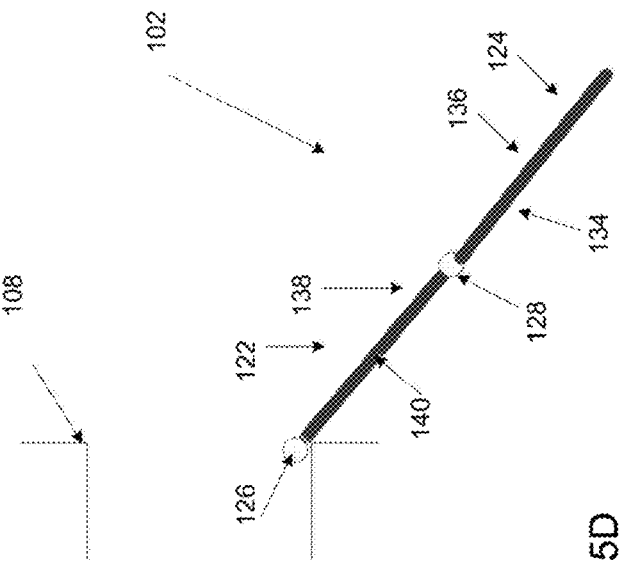

Optionally, the motorhome can have a door assembly that is configured for positioning in a folded configuration. As shown in FIGS. 4A and 5A, in the folded configuration, the door assembly can be embedded in and/or aligned with the wall of the motor home. In another aspect, the emergency exit door can comprise the first door panel portion and the second door panel portion. The first door panel portion can define the first inner wall of the motorhome. In a further aspect, the first panel portion can be defined in the first inner wall of the motorhome.

In use, when the second panel of the emergency exit door assembly 200 is in the use position, the primary headboard component 250 can be positioned above the head portion of the bed pedestal. In exemplary aspects, the motorhome can further comprise complementary headboard portions 320 positioned on opposing sides of the egress opening 216 within the first inner wall 210. In these aspects, when the first panel 220 is positioned in the closed position and the second panel 240 is positioned in the use position, the complementary headboard portions 320 can cooperate with the primary headboard component 250 to define a headboard. It is contemplated that the primary headboard component 250 and the complementary headboard portions 320 can have complementary design portions that are adjacent each other when the second panel 240 is in the use position to thereby produce a consistent design profile for the headboard. It is contemplated that the headboard portions 320 can be secured (e.g., mounted) to the interior surface 212 of the wall 210 of the motorhome using any conventional mechanism, including fasteners.

In addition to including a headboard component 250, it is contemplated that the motorhome can further comprise at least one cabinet 340 that is secured to the first inner wall 210 and positioned above the emergency exit door assembly. Optionally, the at least one cabinet 340 can comprise a plurality of cabinets.

Method of Manufacturing a Motorhome

A method for manufacturing a motorhome can comprise forming an opening through a wall of the vehicle (e.g., motorhome). Next, the method can include positioning a head portion of a bed pedestal proximate to an inner surface of the wall of the motorhome, wherein the opening is positioned above the head portion of the bed pedestal. The method can further include coupling the emergency exit door assembly to the wall of the motorhome. Coupling can comprise a) movably coupling the door panel of the emergency exit door assembly to the wall of the vehicle; b) positioning the door panel in the closed position such that the door panel is received within the opening of the wall of the motorhome to enclose a living space within the motorhome; and, optionally, c) removably securing the primary headboard component. It is further contemplated that securing the headboard can include attaching the headboard to at least one of: (a) an inner surface of the door panel or (b) an interior surface of the wall of the motorhome such that the primary headboard component overlies at least a portion of the inner surface of the door panel to at least partially conceal the presence of the door panel within the living space of the motorhome.

Optionally, there can be a method of manufacturing a motor home having an emergency exit door that is moveable from a folded configuration to an unfolded configuration as disclosed herein. The method of manufacturing a motorhome can include forming an opening through a wall of the motorhome. The method can further include positioning a bed pedestal proximate an inner surface of the wall of the motorhome. The method can also include coupling the emergency exit door assembly to the wall of the motorhome. It is further contemplated that coupling of the emergency exit door assembly to the wall can include pivotally coupling the first panel portion of the emergency exit door assembly to the wall of the vehicle. Coupling can also include positioning the first and second panel portions in the closed, folded configuration such that the door panel is received within the opening of the wall of the motorhome to enclose a living space within the motorhome.

In further exemplary aspects, a method of manufacturing a vehicle (e.g., motorhome) can comprise forming an egress opening through a wall of the motorhome. The method can further comprise positioning a head portion of a bed pedestal proximate an inner surface of the wall of the motorhome. As described herein, at least a portion of the egress opening can be positioned above the head portion of the bed pedestal. In further aspects, the method can comprise coupling the emergency exit door assembly to the wall of the motorhome. In exemplary aspects, coupling the emergency exit door assembly to the wall of the motorhome can comprise: movably coupling the first panel of the emergency exit door assembly to the wall of the vehicle; positioning the first panel in the closed position such that the first panel is received within the egress opening of the wall of the motorhome; and positioning the second panel in the use position to enclose a living space within the motorhome. In operation, when the first panel is positioned in the closed position and the second panel is positioned in the use position, the second panel can overlie at least a portion of the inner surface of the first panel to at least partially conceal the presence of the ladder and the first panel within the living space of the motorhome, and the primary headboard component can be positioned above the head portion of the bed pedestal.

Optionally, as further described herein, the motorhome can comprise complementary headboard portions positioned on opposing sides of the egress opening within the wall of the motorhome. In operation, when the first panel is positioned in the closed position and the second panel is positioned in the use position, the complementary headboard portions can cooperate with the primary headboard component to define a headboard.

In use, when it is necessary to exit the vehicle (e.g., motorhome) from the bedroom area, the method can further comprise detaching the second panel from the wall of the motorhome. Optionally, such detachment can be achieved by disengaging a securing mechanism (e.g., at least one latch) that held the second panel in the use position. In another aspect, the method can further comprise positioning the first panel in the open position to expose the egress opening of the wall of the motorhome. Optionally, in this aspect, the first panel can be moved to the open position following disengagement of a securing mechanism (e.g., at least one latch) that held the first panel in the closed position. It is further contemplated that a user can apply an outward force (away from the living area) to the inner surface of the first panel to thereby effect movement of the first panel from the closed position to the open position.

Optionally, it is further contemplated that dampening shocks can be used to control the speed at which the first panel is moved to the open position, thereby protecting the outer wall of the vehicle and also anything that may be outside the vehicle. Such dampening shocks can be installed on the inside of the egress door connected to the egress door frame.

EXEMPLARY ASPECTS

In view of the described systems and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An emergency exit door assembly for a vehicle, the vehicle having a living space that is at least partially enclosed by a wall with an interior surface and an exterior surface, the door assembly comprising: a door panel that is movably coupled to the wall of the vehicle, wherein the door panel has an inner surface and an outer surface and is configured for selective movement about and between a closed position in which the inner surface of the door panel cooperates with the interior surface of the wall to enclose the living space and an open position in which an opening within the wall is exposed; and a headboard subassembly comprising a primary headboard component that is configured for selective positioning in an operative position, wherein, when the primary headboard component is in the operative position and the door panel is in the closed position, the primary headboard component is secured to at least one of: (a) the inner surface of the door panel or (b) the interior surface of the wall of the vehicle; and overlies at least a portion of the inner surface of the door panel to at least partially conceal the presence of the door panel within the living space of the vehicle.

Aspect 2: The emergency exit door assembly of aspect 1, wherein the primary headboard component is selectively detachable from the vehicle to permit access to the door panel within the living space of the vehicle.

Aspect 3: The emergency exit door assembly of aspect 1 or aspect 2, wherein the door panel is pivotally coupled to the wall, and wherein the door panel is configured for pivotal movement relative to a vertical pivot axis such that the door panel opens and closes in a horizontal direction.

Aspect 4: The emergency exit door assembly of aspect any one of the preceding aspects, wherein the door panel is pivotally coupled to the wall, and wherein the door panel is configured for pivotal movement relative to a horizontal pivot axis such that the door panel opens in a downward direction and closes in an upward direction.

Aspect 5: The emergency exit door assembly of any one of the preceding aspects, wherein the inner surface of the door panel defines a slide that is configured to permit sliding evacuation from the living space when the door panel is in the open position.

Aspect 6: The emergency exit door assembly of aspect any one of the preceding aspects, wherein the door panel comprises an expandable ladder assembly that is moveable about and between a retracted position and an expanded position, wherein when the door panel is in the closed position, the expandable ladder assembly is in the retracted position, and wherein when the door panel is in the open position, the expandable ladder assembly is in the expanded position.

Aspect 7: The emergency exit door assembly of aspect 6, wherein in the expanded position, the expandable ladder assembly extends downwardly from the opening in the wall toward a ground surface.

Aspect 8: The emergency exit door assembly of aspect 6, wherein the expandable ladder assembly comprises a frame portion and a step portion that is pivotally coupled to the frame portion, wherein in the expanded position, the step portion pivots downwardly relative to the frame portion, and wherein the step portion cooperates with the frame portion to define a ladder configured to permit evacuation from the living space.

Aspect 9: The emergency exit door assembly of any one of the preceding aspects, wherein the door panel comprises a first panel portion and a second panel portion, wherein the first panel portion is pivotally coupled to the wall at a first pivot location and configured for pivotal movement relative to the horizontal pivot axis, wherein the second panel portion is pivotally connected to the first panel portion at a second pivot location that is spaced distally from the first pivot location, wherein each of the first and second panel portions has respective opposing first and second face surfaces, wherein the first and second panel portions are moveable about and between a folded configuration and an unfolded configuration, wherein in the folded configuration: the second panel portion is folded inwardly relative to the first panel portion such that the door panel is positioned in the closed position; the first face surface of the second panel portion defines the inner surface of the door panel; the second face surface of the second panel portion and the first face surface of the first panel portion cooperate to define an interior space within the door panel; and the second face surface of the first panel portion defines a portion of the exterior surface of the wall, and wherein in the unfolded configuration: the first panel portion pivots downwardly from the wall such that the door panel is positioned in the open position; the second panel portion pivots outwardly relative to the first panel portion; and the second face surface of the second panel portion and the first face surface of the first panel portion cooperate to define a pathway to permit exit from the living space of the vehicle.

Aspect 10: The emergency exit door assembly of aspect 9, wherein in the unfolded configuration, the second face surface of the second panel portion and the first face surface of the first panel portion cooperate to define a slide surface.

Aspect 11: The emergency exit door assembly of aspect 9, wherein at least one of the second face surface of the second panel portion or the first face surface of the first panel portion define steps that form at least a portion of a ladder when the door panel is in the unfolded configuration.

Aspect 12: The emergency exit door assembly of any one of the previous aspects, wherein the door panel is pivotally coupled to the wall by a hinged connection.

Aspect 13: The emergency exit door assembly of any one of the previous aspects, further comprising at least one latch configured to selectively secure the door panel in the closed position.

Aspect 14: The emergency exit door assembly of aspect 13, wherein the at least one latch comprises a plurality of latches.

Aspect 15: The emergency exit door assembly of any one of the previous aspects, further comprising at least one bumper projecting from the exterior surface of the wall, wherein the at least one bumper is configured to prevent contact between the door panel and the exterior surface of the wall when the door panel is positioned in the open position.

Aspect 16: The emergency exit door assembly of any one of the previous aspects, further comprising at least one restriction cable secured to and extending between the wall and the door panel, wherein the restriction cable is configured to limit movement of the door panel when the door panel is moved from the closed position to the open position.

Aspect 17: The emergency exit door assembly of any one of the previous aspects, wherein the headboard subassembly further comprises complementary headboard portions positioned on opposing sides of the opening within the wall, wherein when the door panel is positioned in the closed position and the primary headboard component is in the operative position, the complementary headboard portions cooperate with the primary headboard component to define a headboard.

Aspect 18: A motorhome having a plurality of inner walls and comprising: a bed pedestal having a head portion positioned proximate to a first inner wall of the motorhome; and an emergency exit door assembly of any one of the previous aspects, wherein the headboard subassembly is positioned above the head portion of the bed pedestal, and wherein the door panel is defined in the first inner wall of the motorhome.

Aspect 19: The motorhome of aspect 18, wherein the motorhome comprises a slide room that defines the first inner wall of the motorhome.

Aspect 20: The motorhome of any one of aspects 18-19, further comprising at least one cabinet that is secured to the first inner wall and positioned above the emergency exit door assembly.

Aspect 21: A method of manufacturing the motorhome of any one of aspects 18-20, comprising: forming an opening through a wall of the motorhome; positioning a head portion of a bed pedestal proximate an inner surface of the wall of the motorhome, wherein the opening is positioned above the head portion of the bed pedestal; and coupling an emergency exit door assembly to the wall of the motorhome, wherein coupling the emergency exit door assembly to the wall of the motorhome comprises: movably coupling the door panel of the emergency exit door assembly to the wall of the vehicle: positioning the door panel in the closed position such that the door panel is received within the opening of the wall of the motorhome to enclose a living space within the motorhome.

Aspect 22: The method of aspect 21, further comprising: removably securing the primary headboard component to at least one of (a) an inner surface of the door panel or (b) an interior surface of the wall of the motorhome such that the primary headboard component overlies at least a portion of the inner surface of the door panel to at least partially conceal the presence of the door panel within the living space of the motorhome.

Aspect 23: An emergency exit door assembly for a vehicle, the vehicle having a living space that is at least partially enclosed by a wall with an interior surface and an exterior surface, the door assembly comprising: a first panel portion that is pivotally coupled to the wall of the vehicle at a first pivot location and configured for pivotal movement relative to a horizontal pivot axis, wherein the first panel portion has opposing first and second face surfaces; and a second panel portion that is pivotally coupled to the first panel portion at a second pivot location that is spaced distally from the first pivot location, wherein the second panel portion has opposing first and second face surfaces, wherein the first and second panel portions are moveable about and between a closed, folded configuration in the living space is enclosed and an open, unfolded configuration in which an opening within the wall is exposed, wherein in the folded configuration: the second panel portion is folded inwardly relative to the first panel portion such that the first face surface of the second panel portion cooperates with the interior surface of the wall to enclose the living space; the second face surface of the second panel portion and the first face surface of the first panel portion cooperate to define an interior space within the wall of the vehicle; and the second face surface of the first panel portion defines a portion of the exterior surface of the wall, and wherein in the unfolded configuration: the first panel portion pivots downwardly from the wall to expose the opening within the wall; the second panel portion pivots outwardly relative to the first panel portion; and the second face surface of the second panel portion and the first face surface of the first panel portion cooperate to define a pathway to permit exit from the living space of the vehicle.

Aspect 24: The emergency exit door assembly of aspect 23, wherein in the open, unfolded configuration, the second face surface of the second panel portion and the first face surface of the first panel portion cooperate to define a slide surface.

Aspect 25: The emergency exit door assembly of aspect 23 or aspect 24, wherein at least one of the second face surface of the second panel portion or the first face surface of the first panel portion define steps that form at least a portion of a ladder when the door panel is in the open, unfolded configuration.

Aspect 26: The emergency exit door assembly of any one of aspects 23-25, wherein the first face surface of the second panel portion defines a portion of a headboard assembly.

Aspect 27: A motorhome having a plurality of inner walls and comprising: a bed pedestal positioned proximate a first inner wall of the motorhome; and an emergency exit door assembly of any one of aspects 23-26, wherein the first and second panel portions are defined in the first inner wall of the motorhome.

Aspect 28: The motorhome of aspect 27, wherein the motorhome comprises a slide room that defines the first inner wall of the motorhome.

Aspect 29: The motorhome of aspect 27 or aspect 28, further comprising at least one cabinet that is secured to the first inner wall and positioned above the emergency exit door assembly.

Aspect 30: A method of manufacturing a motorhome of any one of aspects 27-29, comprising: forming an opening through a wall of the motorhome; positioning a bed pedestal proximate an inner surface of the wall of the motorhome; and coupling an emergency exit door assembly of any one of aspects 23-26 to the wall of the motorhome, wherein coupling the emergency exit door assembly to the wall of the motorhome comprises: pivotally coupling the first panel portion of the emergency exit door assembly to the wall of the vehicle; and positioning the first and second panel portions in the closed, folded configuration such that the door panel is received within the opening of the wall of the motorhome to enclose a living space within the motorhome.

Aspect 31: An emergency exit door assembly for a vehicle, the vehicle having a living space that is at least partially enclosed by a wall, the wall having an interior surface and an exterior surface, the door assembly comprising: a first panel that is movably coupled to the wall of the vehicle, wherein the first panel has an inner surface and an outer surface and is configured for selective movement about and between a closed position in which the door panel is received within an egress opening of the wall and an open position in which the egress opening of the wall is exposed, wherein in the closed position, the inner surface of the first panel faces the living space of the vehicle relative to a transverse axis and the outer surface of the first panel is adjacent portions of the exterior surface of the wall that surround the egress opening, and wherein in the open position, the inner surface of the fast panel faces away from the living space of the vehicle relative to the transverse axis and the outer surface of the first panel faces the living space of the vehicle relative to the transverse axis; a ladder having a plurality of steps and a frame, wherein the frame is secured to the inner surface of the first panel, and wherein the plurality of steps are secured to the frame; a second panel that is removably coupled to the wall of the vehicle, wherein the second panel has an inner surface and an outer surface, wherein in a use position, the second panel is coupled to the wall of the vehicle and received within the egress opening such that the inner surface of the second panel faces the living space of the vehicle relative to the transverse axis and the outer surface of the second panel faces away from the living space of the vehicle relative to the transverse axis, and wherein the second panel is selectively detachable from the wall of the vehicle to expose the egress opening within the wall; and a primary headboard component secured to the inner surface of the second panel, wherein when the first panel is in the closed position and the second panel is in the use position, the inner surface of the first panel and the outer surface of the second panel enclose the ladder within the egress opening, and the primary headboard component is configured to define at least a portion of a headboard extending along a portion of the interior surface of the wall of the vehicle.

Aspect 32: The emergency exit door assembly of aspect 31, wherein when the first panel is in the closed position and the second panel is in the use position, the second panel overlies at least a portion of the inner surface of the first panel to at least partially conceal the presence of the first panel and the ladder within the living space of the vehicle.

Aspect 33: The emergency exit door assembly of aspect 31 or aspect 32, wherein the primary headboard component is selectively detachable from the inner surface of the second panel.

Aspect 34: The emergency exit door assembly of any one of aspects 31-33, wherein the first panel is pivotally coupled to the wall, and wherein the first panel is configured for pivotal movement relative to a horizontal pivot axis such that the first panel opens in a downward direction and closes in an upward direction.

Aspect 35: The emergency exit door assembly of any one of aspects 31-34, wherein the steps of the ladder are moveable about and between a retracted position and an expanded position, wherein when the first panel is in the closed position, the steps are in the retracted position, and wherein when the first panel is in the open position, the steps are in the expanded position.

Aspect 36: The emergency exit door assembly of aspect 35, wherein in the expanded position, the steps of the ladder extend downwardly from the opening in the wall toward a ground surface.

Aspect 37: The emergency exit door assembly of aspect 36, wherein the steps of the ladder are pivotally coupled to the frame of the ladder, and wherein in the expanded position, the steps pivot downwardly relative to the frame portion.

Aspect 38: The emergency exit door assembly of any one of aspects 34-37, wherein the first panel is pivotally coupled to the wall by a hinged connection.

Aspect 39: The emergency exit door assembly of any one of aspects 31-38, further comprising at least one latch configured to selectively secure the second panel in the use position.

Aspect 40: The emergency exit door assembly of aspect 39, wherein the at least one latch comprises a plurality of latches.

Aspect 41: The emergency exit door assembly of any one of aspects 35-40, further comprising at least one panel bumper secured to the inner surface of the first panel, wherein the at least one panel bumper is configured to prevent the steps of the ladder from contacting the inner surface of the first panel when the steps are in the retracted position.

Aspect 42: The emergency exit door assembly of any one of aspects 31-41, further comprising at least one wall bumper projecting from the exterior surface of the wall, wherein the at least one wall bumper is configured to prevent contact between the outer surface of the first panel and the exterior surface of the wall when the first panel is positioned in the open position.

Aspect 43: A motorhome having a plurality of inner walls that surround a living area, the motorhome comprising: a bed pedestal having a head portion positioned proximate a first inner wall of the motorhome, wherein the first inner wall defines an egress opening extending from the living area of the motorhome to an exterior area surrounding the motorhome; and an emergency exit door assembly of any one of aspects 31-42, wherein when the second panel of the emergency exit door assembly is in the use position, the primary headboard component is positioned above the head portion of the bed pedestal.

Aspect 44: The motorhome of aspect 43, further comprising complementary headboard portions positioned on opposing sides of the egress opening within the first inner wall, wherein when the first panel is positioned in the closed position and the second panel is positioned in the use position, the complementary headboard portions cooperate with the primary headboard component to define a headboard.

Aspect 45: The motorhome of aspect claim 44, wherein the motorhome comprises a slide room that defines the first inner wall of the motorhome.

Aspect 46: The motorhome of any one of aspects 43-45, further comprising at least one cabinet that is secured to the first inner wall and positioned above the emergency exit door assembly.

Aspect 47: A method of manufacturing a motorhome, comprising: forming an egress opening through a wall of the motorhome; positioning a head portion of a bed pedestal proximate an inner surface of the wall of the motorhome, wherein the egress opening is positioned above the head portion of the bed pedestal; and coupling an emergency exit door assembly of any one of aspects 31-42 to the wall of the motorhome, wherein coupling the emergency exit door assembly to the wall of the motorhome comprises: movably coupling the first panel of the emergency exit door assembly to the wall of the vehicle; positioning the first panel in the closed position such that the first panel is received within the egress opening of the wall of the motorhome; positioning the second panel in the use position to enclose a living space within the motorhome, wherein when the first panel is positioned in the closed position and the second panel is positioned in the use position, the second panel overlies at least a portion of the inner surface of the first panel to at least partially conceal the presence of the ladder and the first panel within the living space of the motorhome, and the primary headboard component is positioned above the head portion of the bed pedestal.

Aspect 48: The method of aspect 47, wherein the motorhome comprises complementary headboard portions positioned on opposing sides of the egress opening within the wall of the motorhome, wherein when the first panel is positioned in the closed position and the second panel is positioned in the use position, the complementary headboard portions cooperate with the primary headboard component to define a headboard.

Aspect 49: The method of aspect 17 or aspect 18, further comprising: detaching the second panel from the wall of the motorhome; and positioning the first panel in the open position to expose the egress opening of the wall of the motorhome.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A method of manufacturing a vehicle, comprising:
positioning a head portion of a bed pedestal proximate an inner surface of a wall of the vehicle, wherein an opening is defined by the wall, the opening being positioned above the head portion of the bed pedestal; and
coupling an emergency exit door assembly to the wall of the vehicle, wherein coupling the emergency exit door assembly to the wall of the vehicle comprises:
removably coupling an inner panel of the emergency exit door assembly to the wall of the vehicle; and
positioning the inner panel in a closed position such that the inner panel is received within the opening of the wall of the vehicle to enclose a living space within the vehicle.

2. The method of claim 1, further comprising:
removably securing a primary headboard component to at least one of: (a) an inner surface of the inner panel or (b) an interior surface of the wall of the motorhome such that the primary headboard component overlies at least a portion of the inner surface of the inner panel to at least partially conceal the presence of the inner panel from within the living space of the motorhome.

3. The method of claim 2, wherein the primary headboard component is selectively detachable from the inner panel.

4. The method of claim 1, further comprising:
coupling an outer panel to the wall of the vehicle, wherein the outer panel is configured for selective movement about and between a closed position in which the outer panel is received within the opening of the wall and an open position in which a portion of the outer panel moves away from the vehicle to expose the opening of the wall; and
securing a frame of a ladder to the outer panel,
wherein when the outer panel is in the open position and the inner panel is detached from the wall of the vehicle, the opening provides access to the ladder from the living space of the vehicle.

5. The method of claim 4, wherein when the outer panel is in the closed position and the inner panel is in the closed position, the ladder is enclosed within the opening of the wall of the vehicle and the primary headboard component is configured to define at least a portion of a headboard extending along a portion of the interior surface of the wall of the vehicle.

6. The method of claim 4, wherein when the outer panel is in the closed position and the inner panel is in the closed position, the inner panel overlies at least a portion of the outer panel to at least partially conceal the presence of the outer panel and the ladder from within the living space of the vehicle.

7. The method of claim 4, wherein the outer panel is pivotally coupled to the wall, and wherein the outer panel is configured for pivotal movement relative to a horizontal pivot axis such that the outer panel opens in a downward direction and closes in an upward direction.

8. The method of claim 7, wherein the outer panel is pivotally coupled to the wall by a hinged connection.

9. The method of claim 4, wherein the ladder comprises steps that are moveable about and between a retracted position and an expanded position, wherein when the outer panel is in the closed position, the steps are in the retracted position, and wherein when the outer panel is in the open position, the steps are in the expanded position.

10. The method of claim 9, wherein in the expanded position, the steps of the ladder extend downwardly from the opening in the wall toward a ground surface.

11. The method of claim 10, wherein the steps of the ladder are pivotally coupled to the frame of the ladder, and wherein in the expanded position, the steps pivot downwardly relative to the frame portion.

12. The method of claim 9, wherein the emergency exit door assembly further comprises at least one panel bumper secured to the inner surface of the outer panel, wherein the at least one panel bumper prevents the steps of the ladder from contacting the outer panel when the steps are in the retracted position.

13. The method of claim 4, wherein the vehicle further comprises at least one wall bumper projecting from an exterior surface of the wall, wherein the at least one wall bumper prevents contact between the outer panel and the exterior surface of the wall when the outer panel is positioned in the open position.

14. The method of claim 1, wherein at least one latch secures the inner panel in the closed position.

15. The method of claim 14, wherein the at least one latch comprises a plurality of latches.

16. The method of claim 1, further comprising detaching the inner panel from the wall of the vehicle to expose the opening within the wall.

17. A motorhome having a plurality of walls that surround a living area, the motorhome comprising:
    a bed pedestal having a head portion positioned proximate a first wall of the motorhome, wherein the first wall defines an egress opening extending from the living area of the motorhome to an exterior area surrounding the motorhome; and
    an emergency exit door assembly comprising:
        an inner panel that is removably coupled to the wall of the vehicle, wherein the inner panel has an inner surface and an outer surface, wherein in a use position, the inner panel is coupled to the wall of the vehicle and received within the egress opening, and wherein the inner panel is selectively detachable from the wall of the vehicle from within the living space to expose the egress opening within the wall.

18. The motorhome of claim 17, wherein the emergency exit door assembly further comprises an outer panel that is movably coupled to the wall of the vehicle, wherein the outer panel is configured for selective movement about and between a closed position in which the outer panel is received within the egress opening and an open position in which a portion of the outer panel moves away from the vehicle to expose the egress opening of the wall.

19. The motorhome of claim 18, wherein the emergency exit door assembly further comprises a ladder having a plurality of steps and a frame, wherein the frame is secured to the outer panel, and wherein the plurality of steps are secured to the frame.

* * * * *